United States Patent
Aritomi

(10) Patent No.: US 10,353,653 B2
(45) Date of Patent: Jul. 16, 2019

(54) INFORMATION PROCESSING TERMINAL, INFORMATION PROCESSING METHOD, AND NON-TRANSITORY COMPUTER-READABLE MEDIUM FOR SPECIFYING A POSITION OF A PRINTER, MEASURING A DISTANCE RANGE IN PLURAL COMMUNICATION MODES

(71) Applicant: CANON KABUSHIKI KAISHA, Tokyo (JP)

(72) Inventor: Masanori Aritomi, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/847,198

(22) Filed: Sep. 8, 2015

(65) Prior Publication Data

US 2016/0077778 A1    Mar. 17, 2016

(30) Foreign Application Priority Data

Sep. 11, 2014    (JP) ................................ 2014-185698

(51) Int. Cl.
*G06F 3/12* (2006.01)
*H04L 29/06* (2006.01)
(Continued)

(52) U.S. Cl.
CPC .......... *G06F 3/1236* (2013.01); *G06F 3/1204* (2013.01); *G06F 3/1221* (2013.01);
(Continued)

(58) Field of Classification Search
CPC .... G06F 3/1226; G06F 3/1285; G06F 3/1292; G06F 3/1293
See application file for complete search history.

(56) References Cited

U.S. PATENT DOCUMENTS

| 2005/0128968 A1* | 6/2005 | Yang ..................... H04W 48/16 370/312 |
| 2008/0052710 A1* | 2/2008 | Iwai ..................... G06F 21/305 718/100 |

(Continued)

FOREIGN PATENT DOCUMENTS

| CN | 1657299 A | 8/2005 |
| CN | 101477448 A | 7/2009 |

(Continued)

OTHER PUBLICATIONS

Chinese Office Action dated Dec. 21, 2017 in corresponding Chinese Patent Application No. 201510566652.6 together with English translation, 32 pages.

(Continued)

*Primary Examiner* — Benny Q Tieu
*Assistant Examiner* — Haris Sabah
(74) *Attorney, Agent, or Firm* — Carter, DeLuca & Farrell LLP

(57) ABSTRACT

According to this invention, in printing from a mobile terminal to a printer, the distance between them is measured in an LE mode, and when the distance reaches a predetermined distance, print data is transmitted to the printer in a normal mode and held in the printer. When the distance becomes shorter, a print execution instruction is issued to the printer in the normal mode, thereby causing the printer to execute printing.

10 Claims, 20 Drawing Sheets

(51) Int. Cl.
  *G06F 21/35* (2013.01)
  *G06F 21/43* (2013.01)
  *G06F 21/60* (2013.01)
  *G06F 21/74* (2013.01)
  *H04W 4/80* (2018.01)
  *H04N 1/00* (2006.01)
  *H04W 4/021* (2018.01)

(52) U.S. Cl.
  CPC ............ *G06F 3/1292* (2013.01); *G06F 21/35* (2013.01); *G06F 21/43* (2013.01); *G06F 21/608* (2013.01); *G06F 21/74* (2013.01); *H04L 63/0492* (2013.01); *H04W 4/80* (2018.02); *G06F 3/1229* (2013.01); *H04N 1/00411* (2013.01); *H04W 4/022* (2013.01); *Y02D 10/1592* (2018.01); *Y02D 70/142* (2018.01); *Y02D 70/144* (2018.01); *Y02D 70/166* (2018.01); *Y02D 70/22* (2018.01)

(56) References Cited

U.S. PATENT DOCUMENTS

| | | | | |
|---|---|---|---|---|
| 2009/0103124 A1* | 4/2009 | Kimura | ................. | G06F 3/1204 358/1.15 |
| 2009/0122340 A1* | 5/2009 | Nagahama | ............ | G06F 3/1207 358/1.15 |
| 2009/0323108 A1* | 12/2009 | Shimma | ............. | H04N 1/00251 358/1.15 |
| 2012/0243038 A1* | 9/2012 | Saeda | .................. | G06F 3/1204 358/1.15 |
| 2013/0050741 A1* | 2/2013 | Raja | ...................... | G06F 3/1204 358/1.15 |
| 2014/0063537 A1* | 3/2014 | Nishikawa | ............ | H04W 4/008 358/1.15 |
| 2014/0085663 A1* | 3/2014 | Kavanappillil | .... | H04N 1/00342 358/1.15 |
| 2014/0211254 A1* | 7/2014 | Takeuchi | ................ | G06F 3/126 358/1.15 |
| 2014/0240764 A1* | 8/2014 | Itogawa | ................ | G06F 3/1236 358/1.15 |
| 2014/0240777 A1* | 8/2014 | Itogawa | ................ | G06F 3/1292 358/1.15 |

FOREIGN PATENT DOCUMENTS

| | | |
|---|---|---|
| CN | 103686943 A | 3/2014 |
| JP | 2008017381 A | 1/2008 |
| JP | 2012118922 A | 6/2012 |
| JP | 2013-236255 A | 11/2013 |
| JP | 2014146202 A | 8/2014 |
| JP | 2014146205 A | 8/2014 |

OTHER PUBLICATIONS

Japanese Office Action dated Aug. 24, 2018 in corresponding Japanese Patent Application No. 2014-185698 with English translation.

* cited by examiner

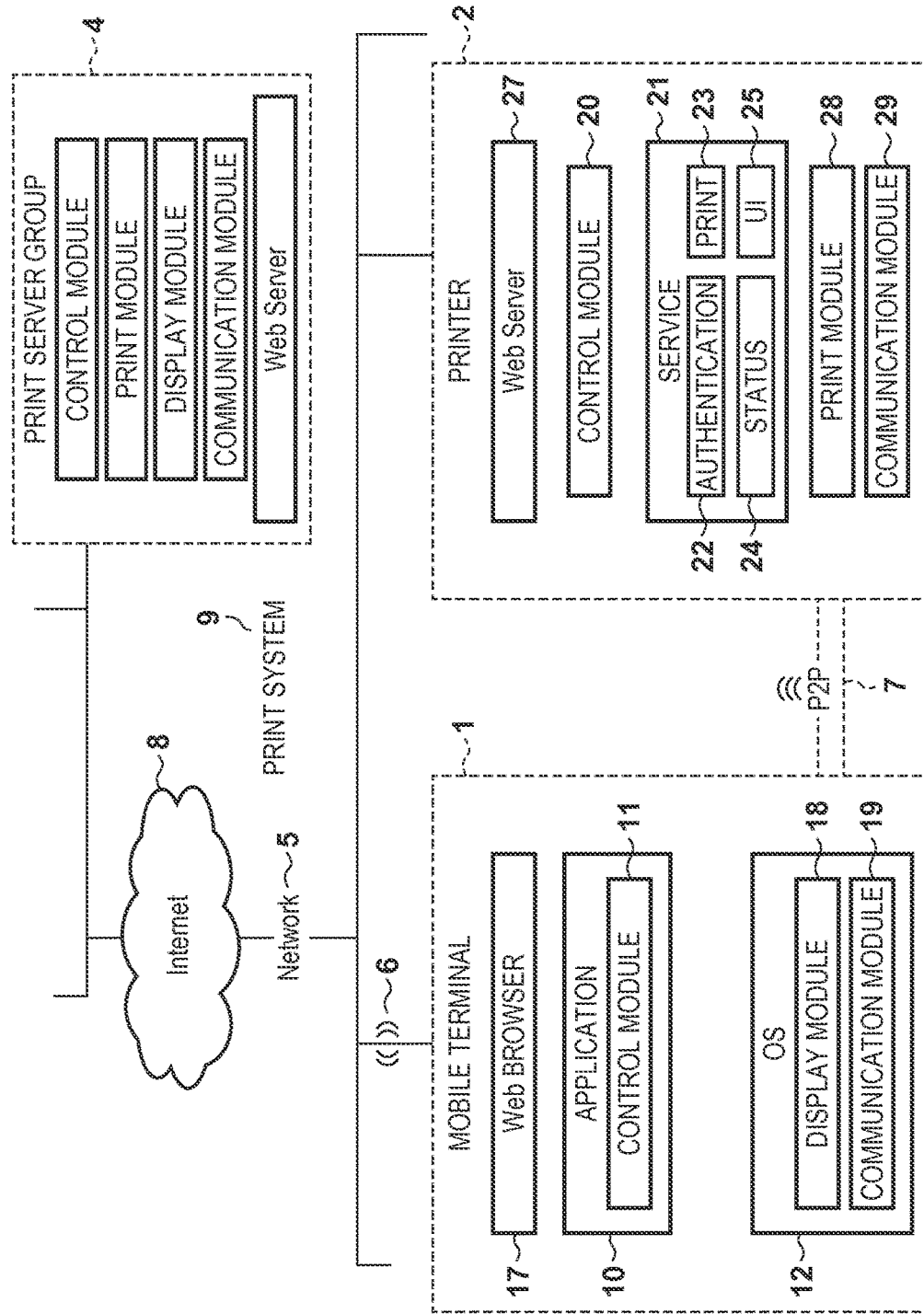

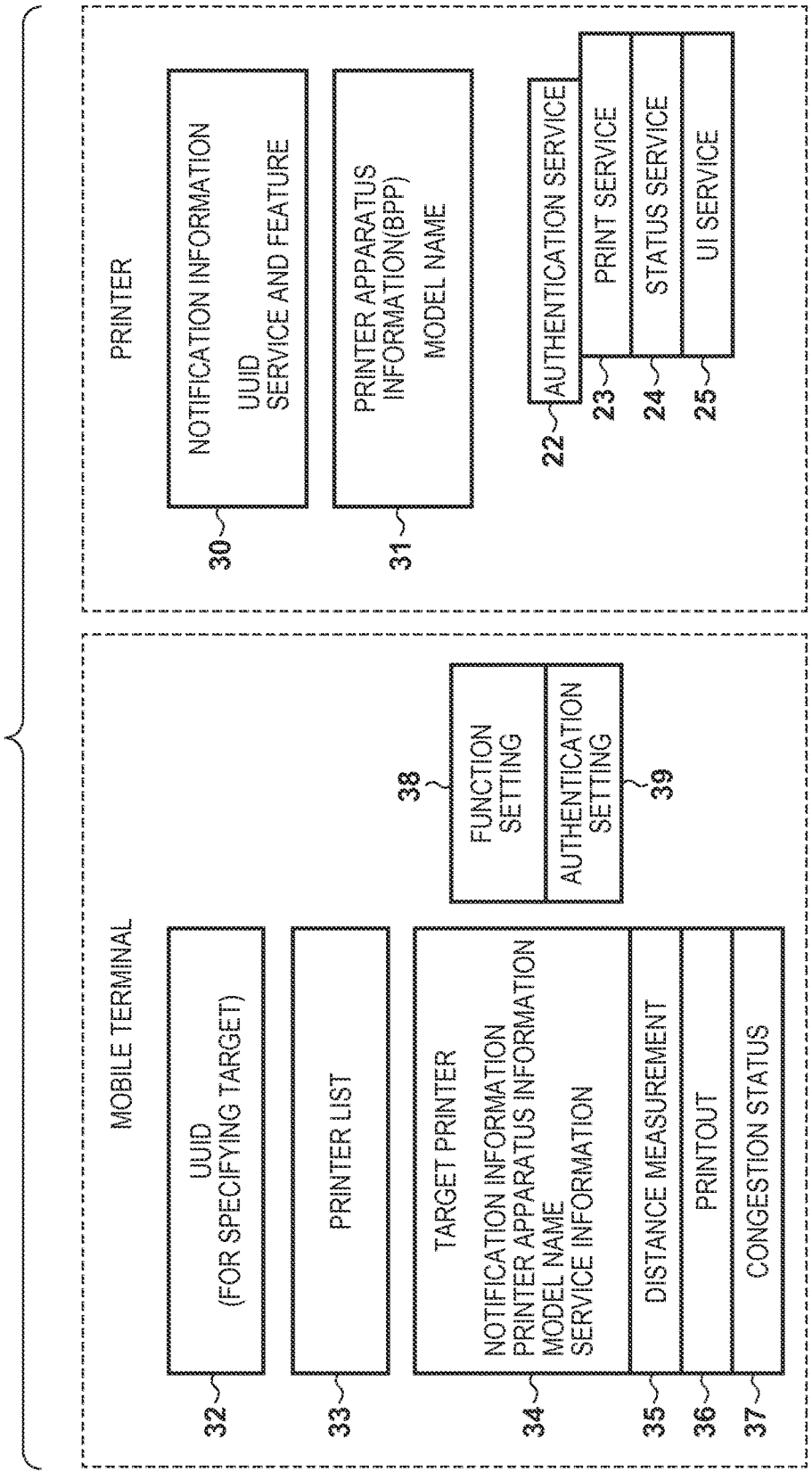

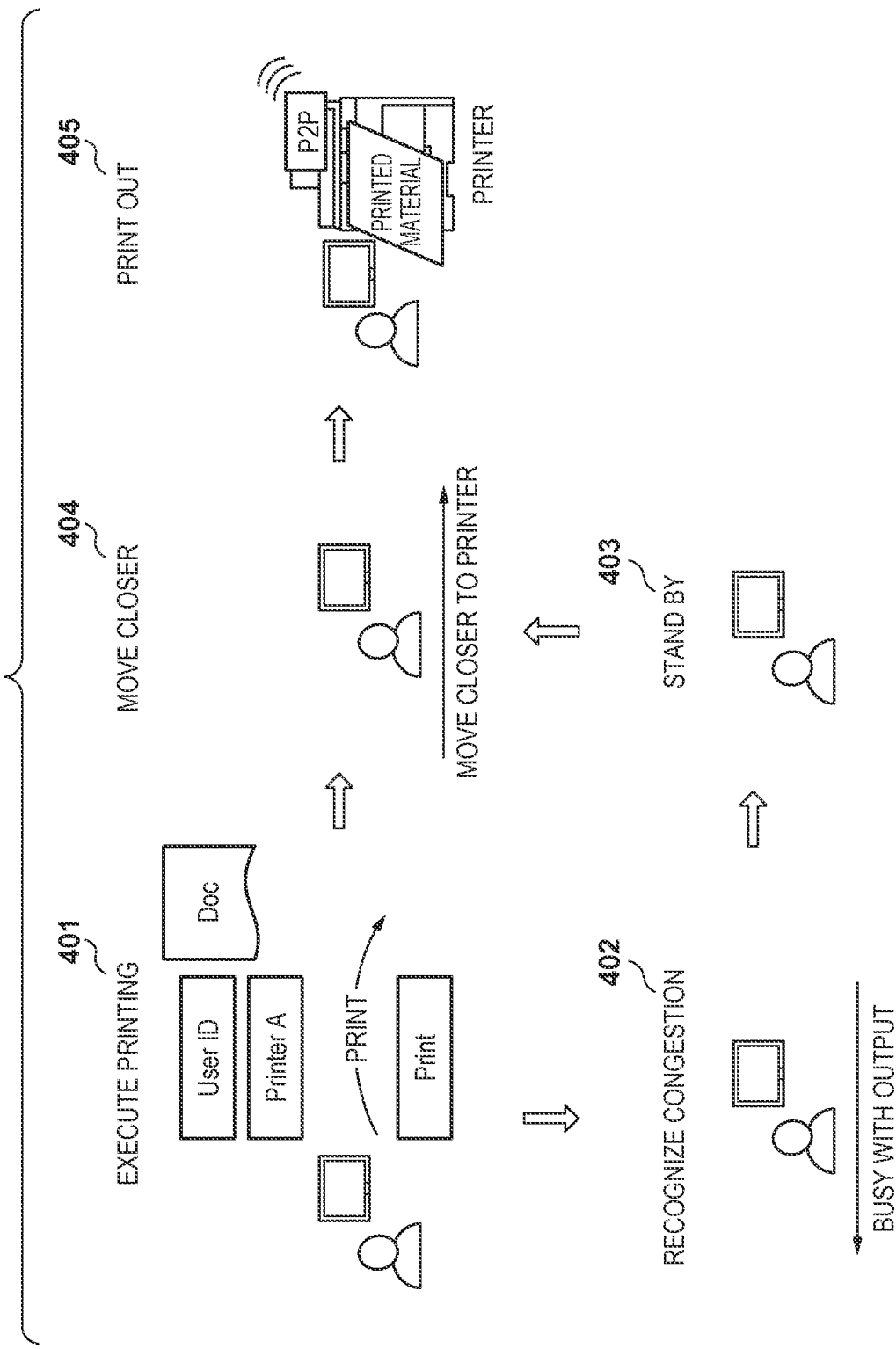

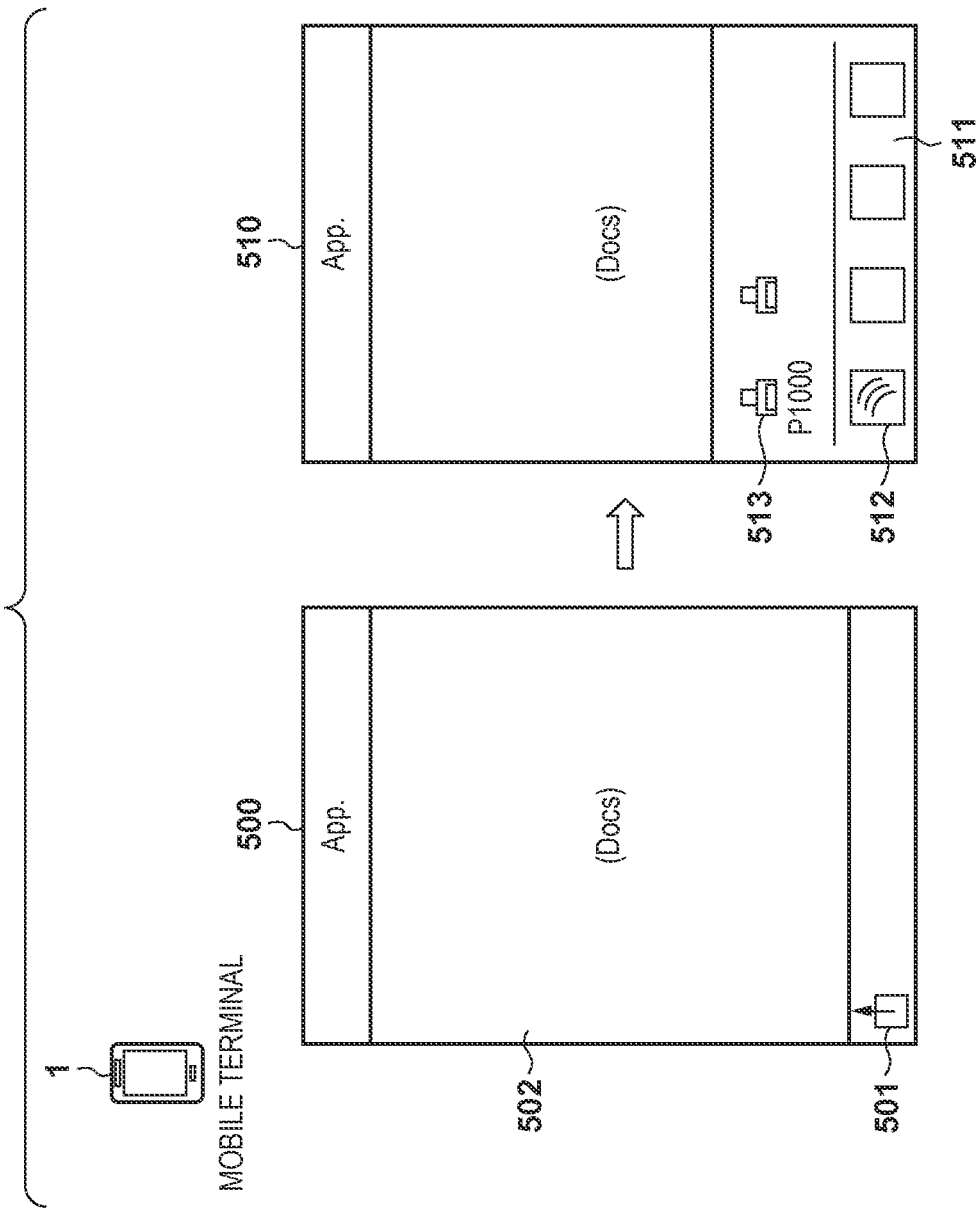

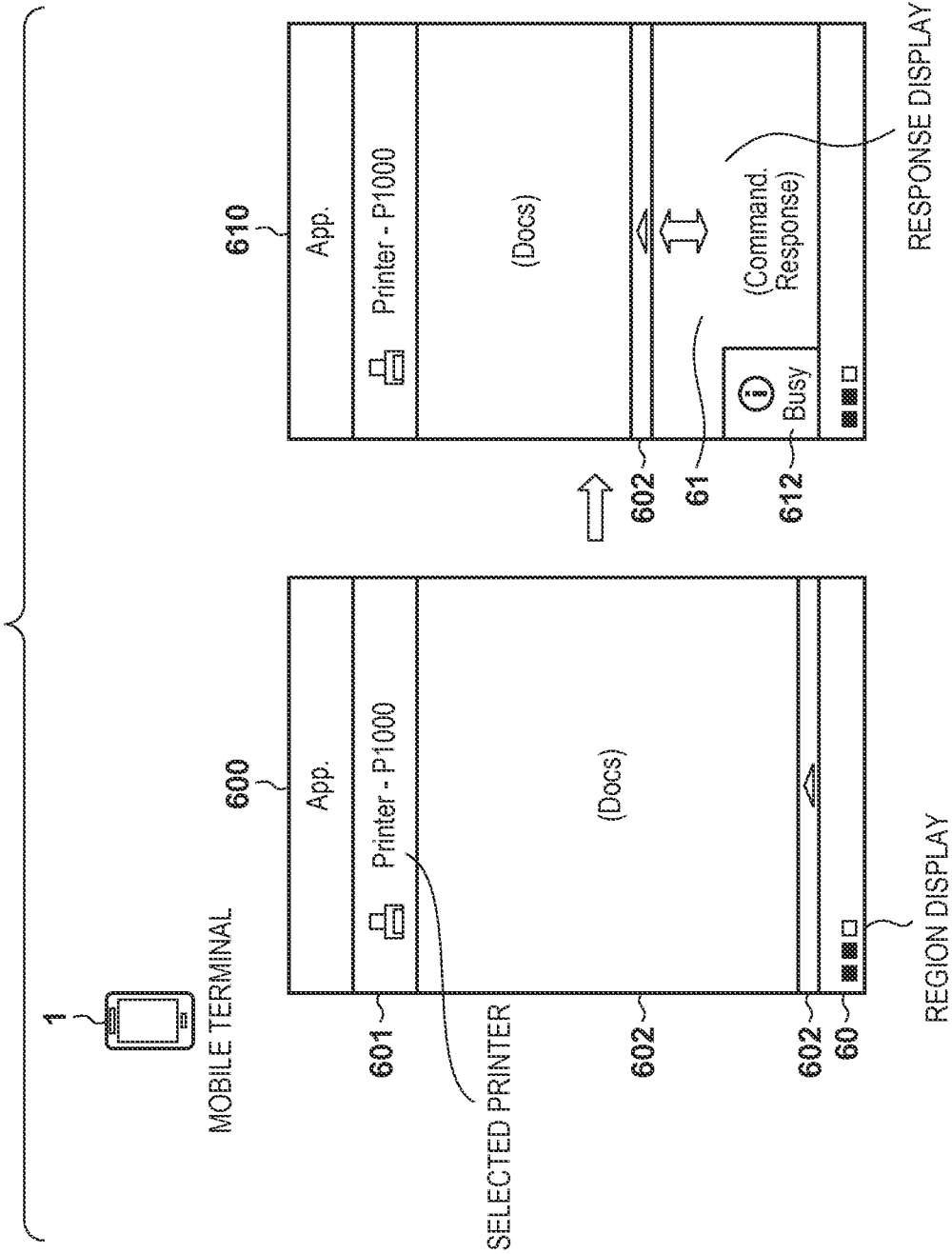

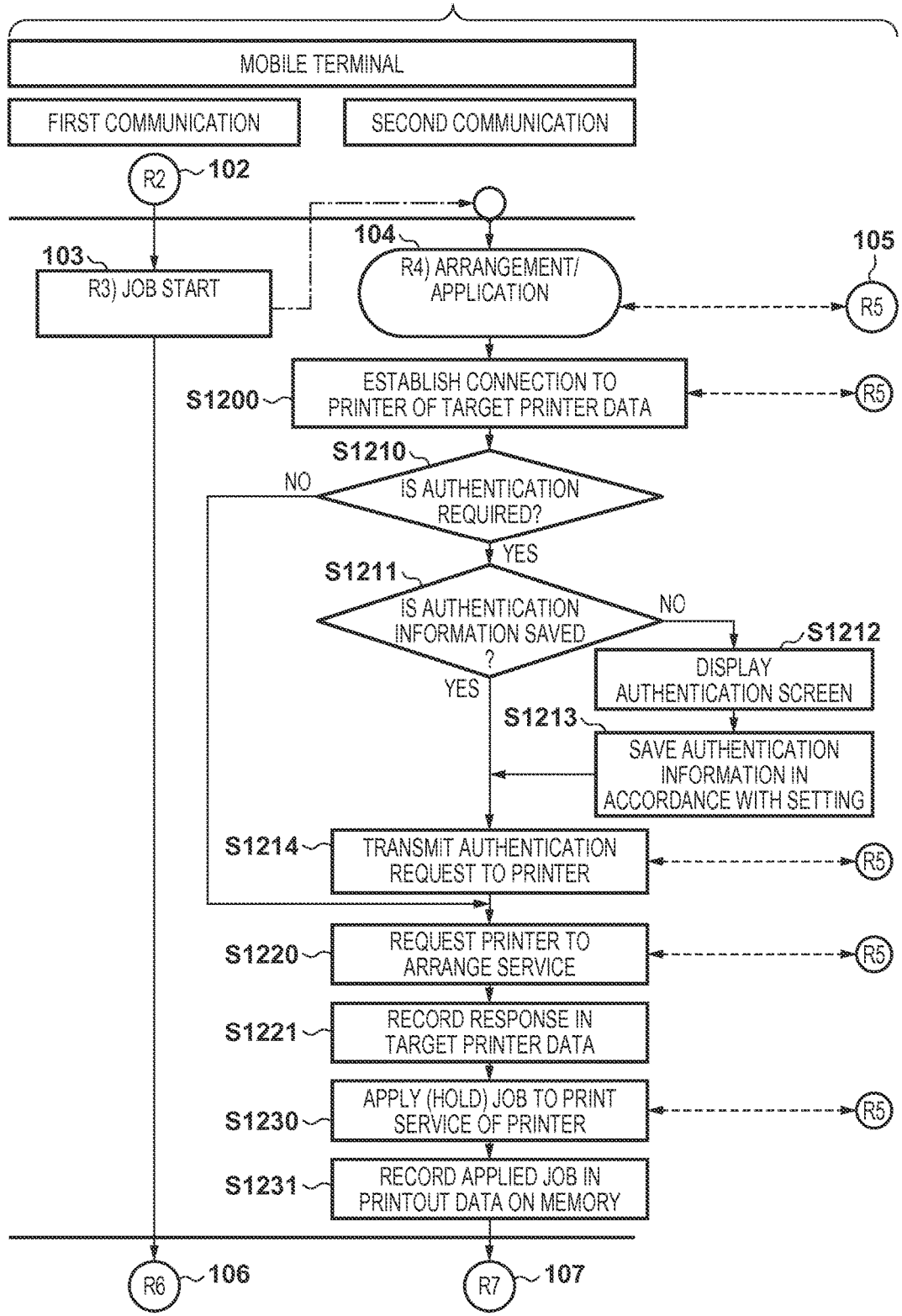

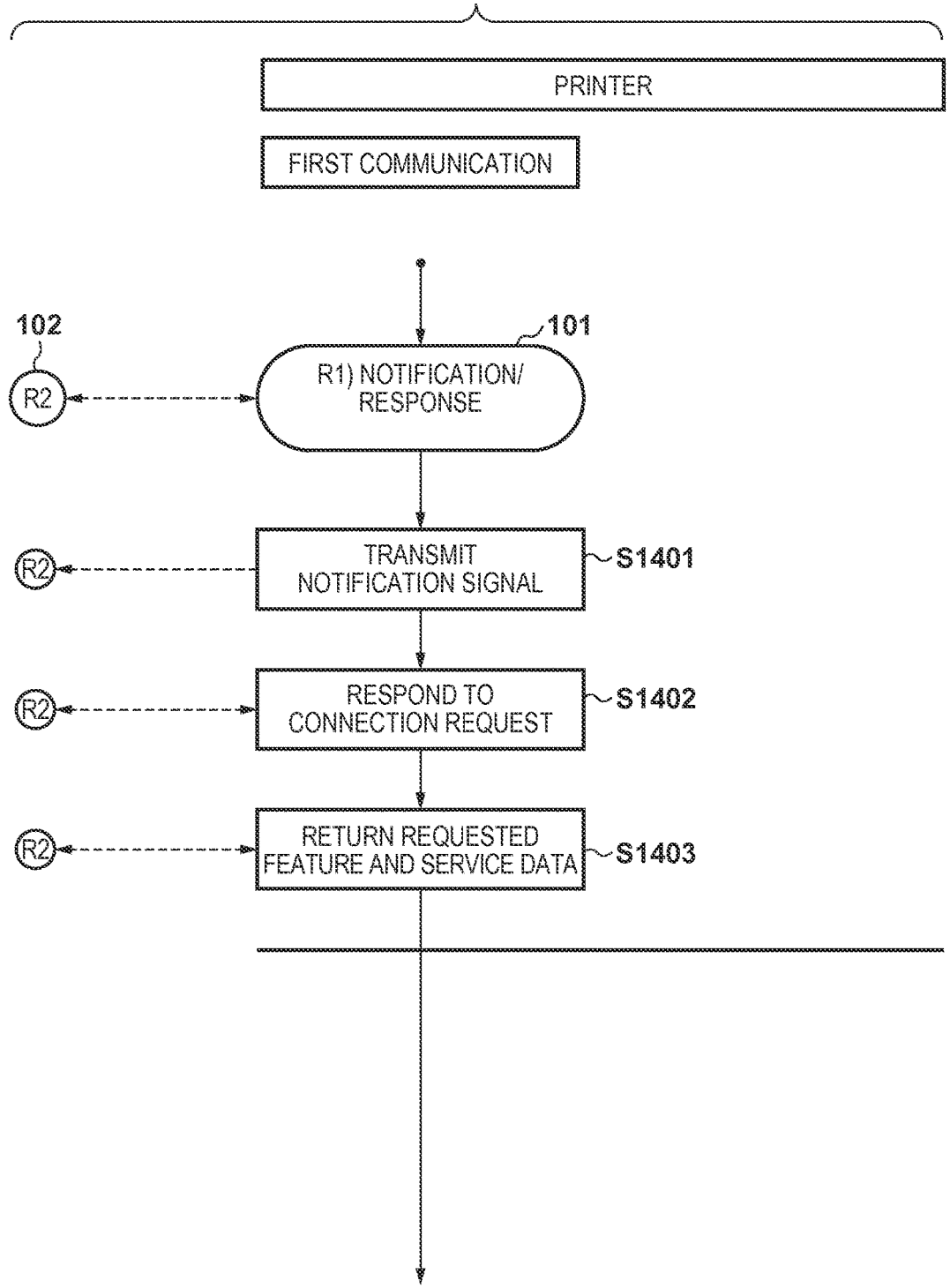

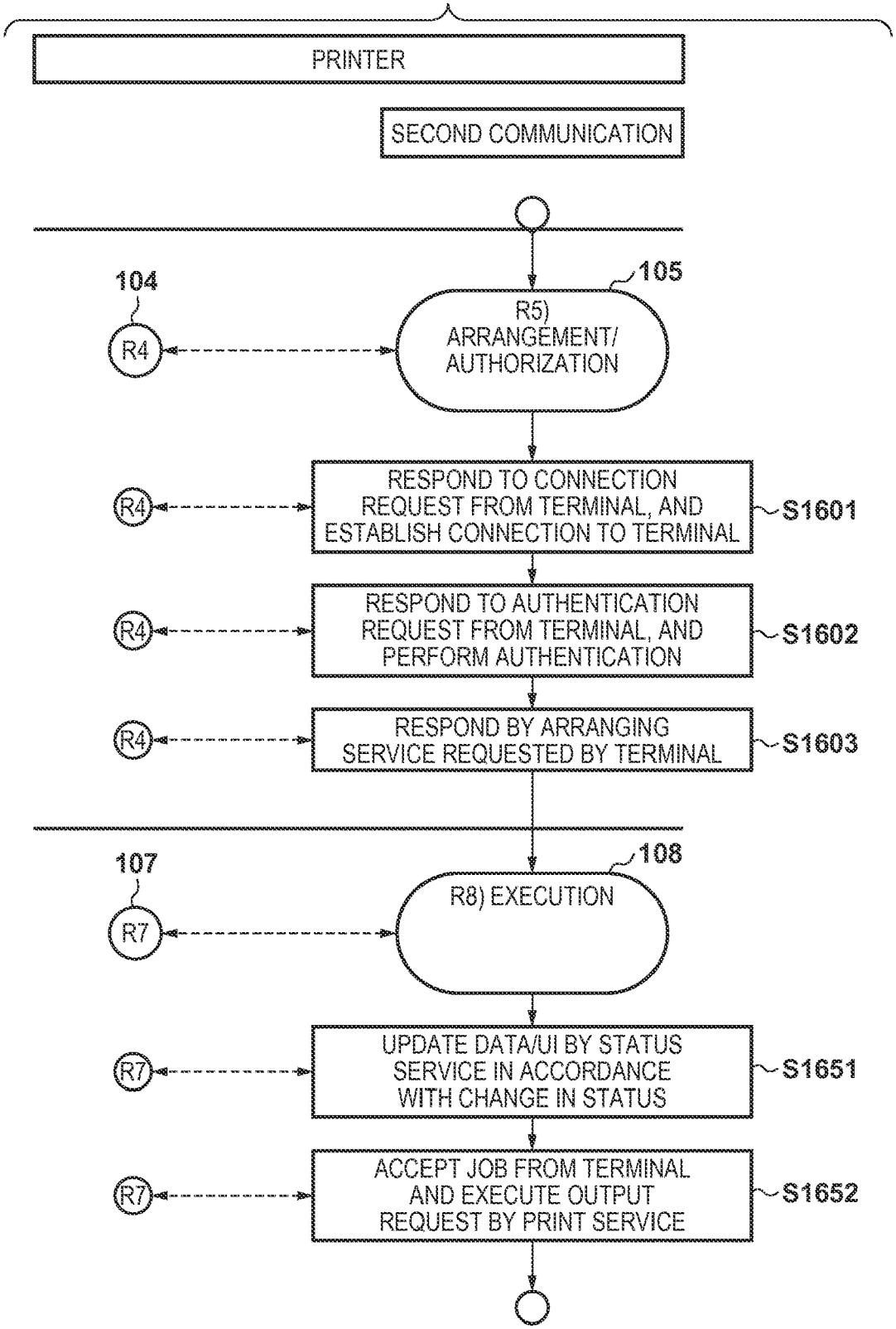

INFORMATION PROCESSING TERMINAL, INFORMATION PROCESSING METHOD, AND NON-TRANSITORY COMPUTER-READABLE MEDIUM FOR SPECIFYING A POSITION OF A PRINTER, MEASURING A DISTANCE RANGE IN PLURAL COMMUNICATION MODES

BACKGROUND OF THE INVENTION

Field of the Invention

The present invention relates to an information processing terminal, an information processing method, and a computer-readable medium.

Description of the Related Art

Printing from a mobile terminal to a printer is attracting attention. There is provided a technique of locally printing to a printer near a mobile terminal using the OS of the mobile terminal or an application provided by a printer vendor. Such mobile terminal has begun to incorporate short distance communication (for example, Wi-Fi Direct®, Bluetooth®, or NFC). The mobile terminal is connected to a corresponding apparatus via the incorporated short distance communication and exchanges data with the apparatus. The mobile terminal and printer can be peer-to-peer-connected by the short distance communication.

On the other hand, there has been developed a technique of specifying the position of an apparatus, measuring a position, and measuring a distance by using a technique (for example, BLE (Bluetooth® Low Energy)) capable of performing long distance communication with low energy among the short distance communication techniques. For example, when a transmitter broadcasts information including apparatus information over BLE, and a receiver receives this signal within a region, it is possible to specify the transmitter and measure the positional relationship. Such transmission of information will be referred to as notification transmission hereinafter and the signal will be referred to as a notification signal hereinafter. There has been developed a peer-to-peer connection technique of using the short distance communication techniques including the LE (Low Energy) mode. iBeacon® is the mechanism of a position information service. Using this mechanism makes it possible to provide a service of sending store sale information by, for example, installing a transmitter in a store and detecting the signal by the mobile terminal of a customer. Japanese Patent Laid-Open No. 2013-236255 discloses an informing control technique of informing the user of the distance between terminals and an orientation by using wireless communication and the generator and receiver of an ultrasonic signal of each terminal. Printing from a mobile terminal to a nearby printer is increasing. In addition, there has been developed a close proximity communication technique between a terminal and a printer.

However, in a conventional print system, or card authentication printing in which when a user who has issued a print job is authenticated with a card in a printer as an issue destination, a printed material is output, if short distance notification transmission is applied, the signal region overlaps that of a nearby printer, and it is thus necessary to select a printer to be used by a mobile terminal, thereby increasing the number of selection operations in authentication or the like, as compared with card authentication printing or the like. Furthermore, since the number of actions is small and a printer use operation is hardly known among users, a problem that the standby time of printing is prolonged arises.

SUMMARY OF THE INVENTION

The present invention has been made in consideration of the above conventional example, and has the following arrangement.

According to one aspect of the present invention, there is provided an information processing terminal comprising: a reception unit configured to receive wirelessly a signal in a first communication mode, which is transmitted from one of a printer and an accessory apparatus of the printer; a specifying unit configured to specify, based on the signal in the first communication mode, a positional relationship with the printer as one of a first distance range, a second distance range closer than the first distance range, and a third distance range further closer than the second distance range; a selection unit configured to select the printer specified based on reception of the signal in the first communication mode; and a control unit configured to perform print control for the selected printer in accordance with the positional relationship with the selected printer specified by the specifying unit, wherein the control unit transfers print data when the positional relationship with the printer falls within the second distance range, and then instructs the printer to delete the transferred print data when the positional relationship with the printer is farther than the first distance range.

According to another aspect of the present invention, there is provided an information processing terminal comprising: a first reception unit configured to receive wirelessly a signal in a first communication mode, which is transmitted from one of a printer and an accessory apparatus of the printer; a specifying unit configured to specify, based on the signal in the first communication mode, a positional relationship with the printer as one of a first distance range, a second distance range closer than the first distance range, and a third distance range further closer than the second distance range; a selection unit configured to select the printer specified based on reception of the signal in the first communication mode; a second unit configured to receive information of a congestion status of the printer from the printer; and a control unit configured to perform print control for the selected printer in accordance with the positional relationship with the selected printer specified by the specifying unit, wherein when the positional relationship with the selected printer falls within the first distance range, the control unit displays the congestion status before a print instruction is issued to the printer.

According to the present invention, in printing from a mobile terminal to a printer, operations including an authentication operation and the standby time are reduced. This improves the user convenience and productivity.

Further features of the present invention will become apparent from the following description of exemplary embodiments with reference to the attached drawings.

BRIEF DESCRIPTION OF THE DRAWINGS

FIG. 3A is a view showing the software arrangement of the print system 9;

FIG. 3B is a block diagram showing data examples of the print system 9;

FIGS. 4A and 4B are views showing an overview of the print operation of the print system 9;

FIG. 5 is a view showing an example of the printer selection screen of an application 10 of the print system 9;

FIG. 6 is a view showing an example of screen display after the start of printing of the application 10;

FIG. 12 is a flowchart illustrating the processes 103 and 104 of the control module 11 of the terminal;

FIG. 14 is a flowchart illustrating the processing 101 of a control module 20 of the printer;

FIG. 16 is a flowchart illustrating another example of the processes 105 and 108 of the control module 20 of the printer.

DESCRIPTION OF THE EMBODIMENTS

Figure 1:
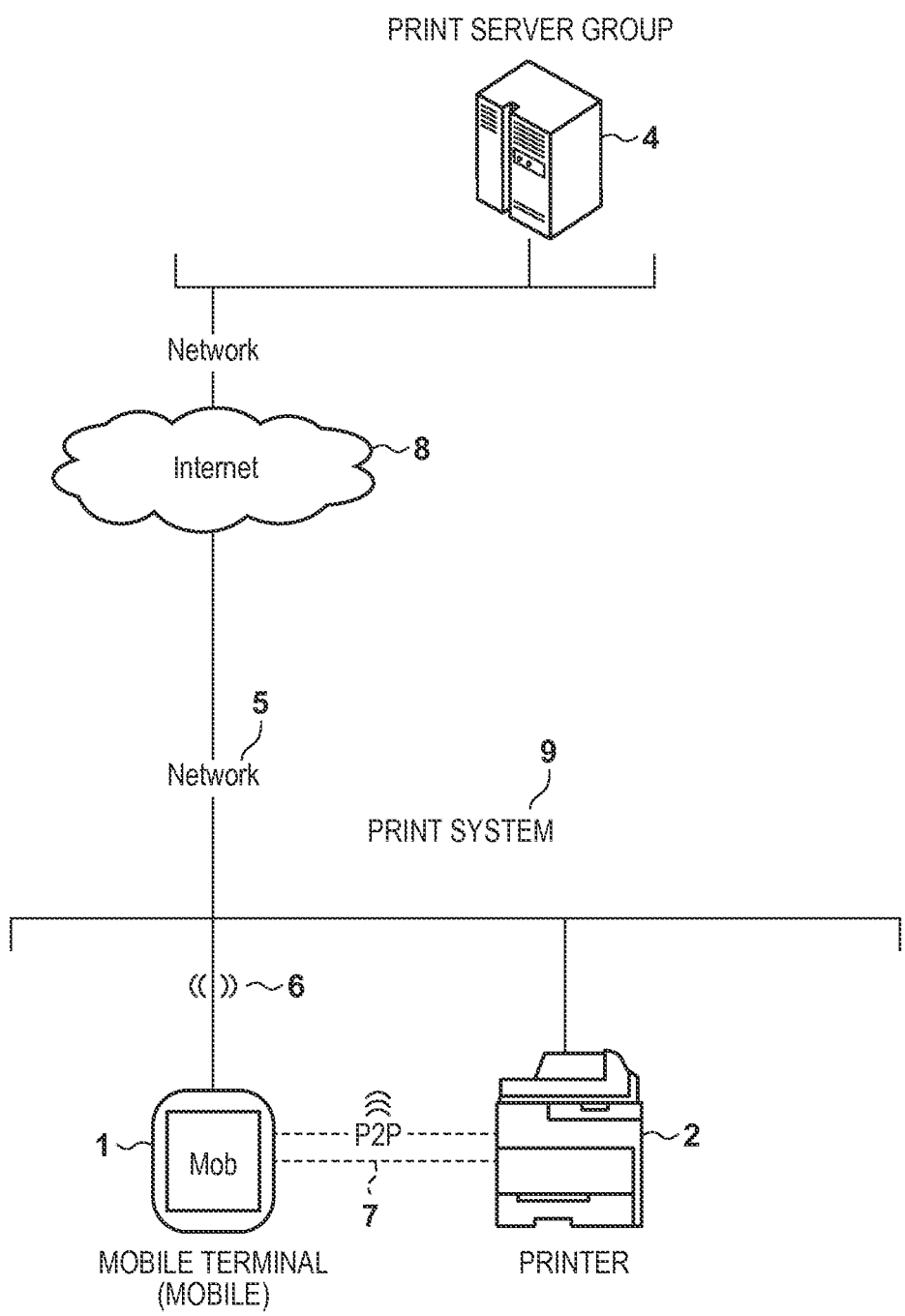
FIG. 1 is a view showing the arrangement of a print system 9.

Embodiments of the present invention will be described below with reference to the accompanying drawings.

First Embodiment

[Detailed Description of Problem]

As described above, there has been developed the technique of specifying the position of an apparatus using BLE. For example, there have been developed broadcasting information including apparatus information by a transmitter over BLE, and the peer-to-peer connection technique of using the short distance communication techniques including the LE mode (low energy mode). BLE is suitable for simple communication of a small amount of data since it is possible to perform long distance communication with low energy. Furthermore, Bluetooth® generally consumes power at an LE mode ratio but can transmit/receive data. BLE is an extended specification of Bluetooth®. There has also been developed a technique of using Bluetooth®, Wi-Fi, and the like. That is, since the short distance communication techniques are extended and used together, a plurality of combinations of techniques are selected. Therefore, in this embodiment, communication complying with the LE mode will be referred to as the first communication mode hereinafter, and a normal mode will be referred to as the second communication mode hereinafter.

As a use form, there is printing in which the user selects a printer as a print destination on a computer to execute printing, and then moves to the printer to perform authentication by touching a card or inputting a PIN code using the operation unit of the printer. The user may operate both the computer and printer, and stand by in front of the operation unit of the printer. However, since the user performs an operation to take action in front of the printer, print destination selection, authentication, and a printed material are strongly linked with each other. As for close proximity communication of a very short distance such as NFC as well, the linkage is strong.

When the first communication mode including short distance notification transmission is applied to the above-described use form, the notification transmission reaches a relatively long distance, and a coverage area is a relatively wide plane. When performing authentication from a mobile terminal, if a plurality of printers are installed, a plurality of authentication screens are displayed, thereby increasing the number of selection operations by the user. Since there is no action such as a touch, it is difficult for users who use a printer to recognize the status, thereby prolonging the standby time of printing. The coverage area is a plane, and linkage between print destination selection, authentication, and a printed material is weakened. Therefore, it is necessary to maintain the linkage while applying notification transmission.

As described above, in the conventional print system or card authentication printing in which card authentication is performed by a printer as a print destination and data is output, if short distance notification transmission is applied, the signal region overlaps that of a nearby printer, thereby increasing the number of selection operations in authentication or the like, as compared with card authentication printing or the like. Furthermore, since the number of actions is small and a printer use operation is hardly known among users, a problem that the standby time of printing is prolonged arises.

[Arrangement of Print System]

FIG. 1 is a view showing the arrangement of a print system according to this embodiment. A print system 9 includes a mobile terminal 1 and printer 2 which are information processing terminals. The print system 9 includes a print server group 4, similarly to the mobile terminal 1. These apparatuses are connected via a network 5, and the network 5 is connected to the Internet 8. Note that the respective apparatuses forming the print system 9 are connectable via the Internet 8, and can perform data communication. The mobile terminal 1 can select mobile communication 6 as a connection method to the Internet 8. The mobile communication 6 includes wireless communication and public line communication. In addition, the mobile terminal 1 and printer 2 can perform peer-to-peer (P2P) communication 7. The P2P communication 7 includes wireless communication such as Bluetooth®, short distance wireless communication (NFC and the like), and infrared communication. The mobile terminal 1 and printer 2 are connectable by the P2P communication 7 without intervention of the Internet 8. A plurality of mobile terminals 1 and a plurality of printers 2 may be arranged. Note that the printer 2 may be configured to be communicable by externally attaching a communication apparatus as an accessory apparatus.

Each server included in the print server group 4 is connected via the network 5 and the network 5 is connected to the Internet 8. As described above, the print server group is formed from a plurality of servers, and thus will be referred to as a server system hereinafter. When the print server group is called a server system, the mobile terminal 1 and printer 2 are not included. Note that in this embodiment, the print server group 4 as a server system need not always include a plurality of servers. The view showing the example of the arrangement of the print system according to this embodiment has been explained above. A view showing an example of a hardware arrangement according to this embodiment will be described.

[Hardware Arrangement]

Figure 2A:
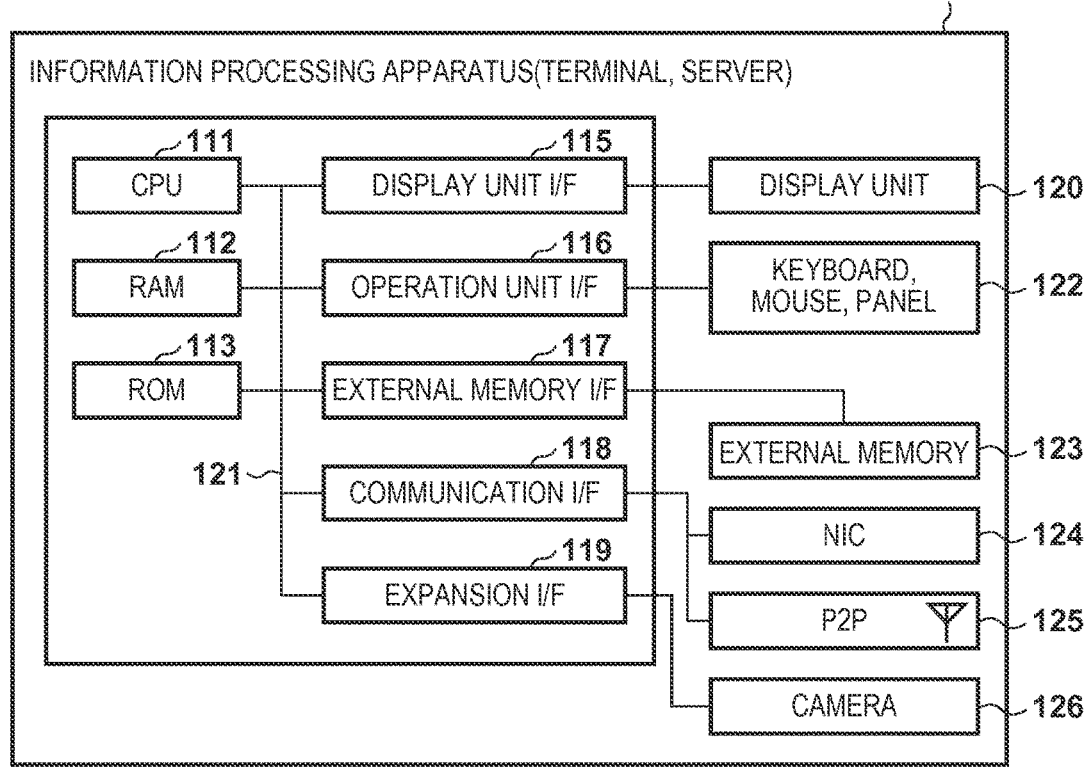
FIG. 2A is a block diagram showing the hardware arrangement of an information processing apparatus.
Figure 2B:
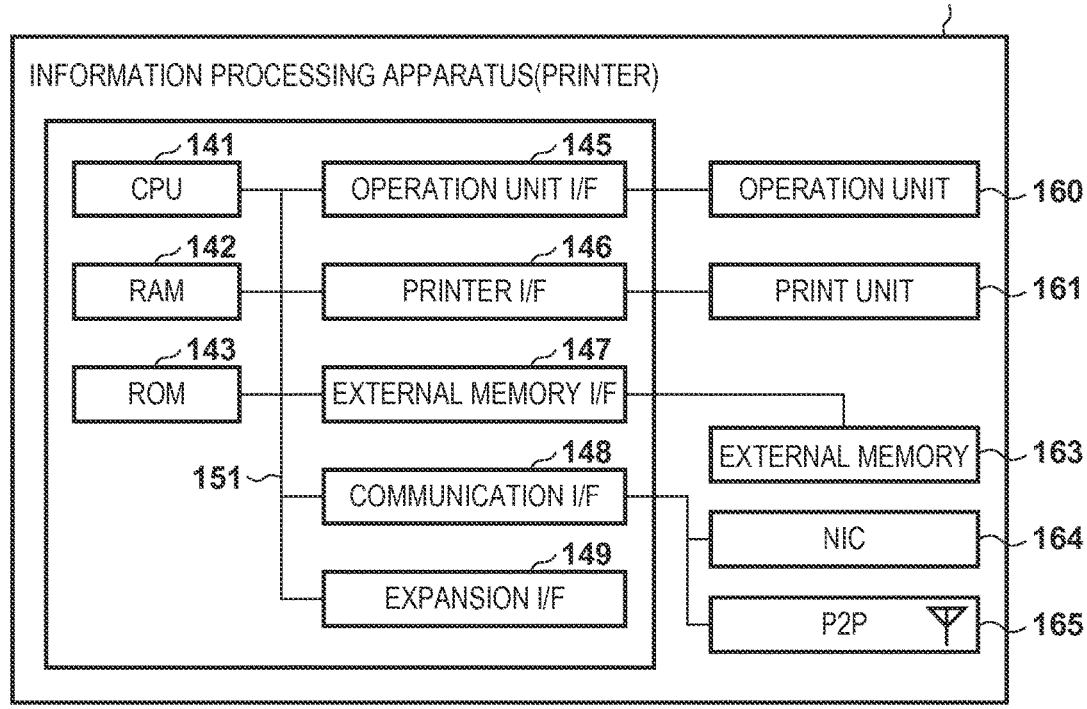
FIG. 2B is a block diagram showing the hardware arrangement of an image processing apparatus.

FIGS. 2A and 2B are block diagrams showing examples of the hardware arrangements of a terminal apparatus and printer. FIG. 2A is a block diagram showing an example the hardware arrangement of the terminal apparatus. Each of the mobile terminal 1 and the servers included in the print server group 4 is formed by hardware components shown in FIG. 2A.

A CPU 111 collectively controls respective devices connected to a system bus 121 according to programs stored in a ROM 113 as a storage unit. A RAM 112 functions as a main memory, a work area, and the like for the CPU 111. The ROM 113 stores various programs and data. An operation unit I/F 116 controls input operations from a keyboard 122, a pointing device (a mouse or the like (not shown)), and a touch panel. A display unit I/F 115 controls display on a display unit 120. An external memory I/F 117 controls access to an external memory 123 such as an HDD, flash memory, or SSD (Solid State Disk).

The external memory 123 functions as a savable or readable storage medium, and stores an operating system (OS), Web browser, and applications. Applications and the programs of respective modules (software) are stored in the external memory 123, and read out into the RAM 112 and executed by the CPU 111, as needed. This implements the applications and the functions of the respective modules (software).

A communication I/F 118 controls communications of NIC 124 and P2P 125. The NIC 124 serves as a connection I/F to the network to allow connection to the network and control transmission/reception of data. Note that the present invention is not limited to the arrangement shown in FIG. 2A, and the apparatus can be connected to a wireless base station via the network by controlling communication with a mobile network or the like. The P2P 125 serves as a connection I/F for P2P communication to allow P2P connection and control connection between apparatuses and transmission/reception of data.

Processing to be explained in this embodiment is implemented by loading the program recorded in the external memory 123 into the RAM 112, and executing it by the CPU 111. Note that the program may be stored in the RAM 112 or ROM 113 instead of the external memory 123.

FIG. 2B is a block diagram showing an example of the hardware arrangement of the printer. A CPU 141 controls the overall operation of the printer 2. The CPU 141 collectively controls respective devices connected to a system bus 151 according to programs stored in a ROM 143. A RAM 142 functions as a main memory, a work area, and the like for the CPU 141, and is also used as an input information loading area and environment data storage area. The RAM 142 includes an NVRAM (Non-Volatile RAM) area and is configured to expand the memory capacity by an optional RAM connected to an expansion port (not shown). The ROM 143 stores various types of fonts, control programs and the like to be executed by the CPU 141, and various kinds of data.

A communication I/F 148 controls communications of NIC 164 and P2P 165. The NIC 164 serves as a connection I/F with the network to control transmission/reception of data to/from the print server group 4, a stationary terminal, and the mobile terminal 1. The P2P 165 serves as a connection I/F for P2P communication to allow P2P connection and control connection between apparatuses and transmission/reception of data. The communication I/F 148 is implemented in accordance with an implementation environment such as a Web service protocol. A printer I/F 146 controls an interface with a print unit 161 as a printer engine. An external memory I/F 147 controls access to an external memory 163. Examples of the external memory 163 are an HDD, flash memory, and SSD. The CPU 141 reads out the program stored in the external memory 163, the ROM, or the like into the RAM 142, as needed, and executes it, thereby implementing the function of the printer 2. An operation unit I/F 145 controls an interface with an operation unit 160 for making various settings of the printer 2.

Processing to be explained in this embodiment is implemented by loading the program recorded in the external memory 163 into the RAM 142, and executing it by the CPU 141. Note that the program may be stored in the RAM 142 or ROM 143 instead of the external memory 163.

The views showing examples of the hardware arrangements according to this embodiment have been described above. A view showing an example of a software arrangement according to this embodiment will be explained.

[Software Arrangement (Program)]

FIG. 3A is a block diagram showing the software arrangement of the print system 9. Respective software components shown in FIG. 3A are implemented when the CPUs 111 and 141 shown in FIGS. 2A and 2B load the programs stored in the ROMs 113 and 143 into the RAMs 112 and 142, and execute the loaded programs.

The software components of the mobile terminal 1 are implemented when the CPU 111 loads, into the RAM 112, the programs received via the communication I/F 118 and stored in the external memory 123, and executes the loaded programs. Similarly, the software components of the printer 2 are implemented when the CPU 141 loads, into the RAM 142, the programs received via the communication I/F 148 and stored in the external memory 163, and executes the loaded programs.

The software arrangement of the mobile terminal 1 will be described. An application 10 includes a control module 11. The control module 11 is loaded to control the operation of the application in the mobile terminal 1. An OS 12 of the mobile terminal 1 includes a communication module 19. The communication module 19 controls communication of the mobile terminal 1, and transmits/receives information to/from the printer 2 and print server group 4. The communication module 19 controls a plurality of communication methods such as the mobile communication 6 and P2P communication 7 to the network 5. The communication module 19 also has a function of storing information necessary for communication. To communicate with the printer 2 and the Web server of the print server group 4, the mobile terminal 1 uses a Web browser 17 as a Web client.

The software arrangement of the printer 2 will be explained. A control module 20 of the printer is loaded to control printing and communication processing. The control module 20 of the printer controls the communication function of a printer communication module 29 via the communication I/F 148, and the print function of a printer print module 28 via the printer I/F 146. Note that since the mobile terminal 1 and printer 2 cooperate with each other, the communication modules 19 and 29 communicate with each other according to a specific communication protocol, and perform transmission/reception of a print job. Authentication information is also saved in the printer communication module 29.

The printer 2 includes a service 21 as a function group to be provided from the printer to the terminal via the communication module 29. The service 21 includes an authentication service 22, a print service 23, a status service 24, and a UI service 25. The printer 2 provides, to the terminal, information about the services to be provided. The information indicates the type of service, capability, location (URI), and the like, and is contained in the above-described notification signal or a response to a request. When the terminal requests a service to be used of the printer 2, the control module 20 of the printer 2 responds to the terminal by loading and creating the service. The control module 20 of the printer 2 controls the print module and the like in accordance with the request to the service 21.

The authentication service 22 is a service for providing the authentication function of the printer 2 to the terminal via the communication module 29. The authentication service 22 executes and manages authentication processing such as authentication for the printer and authorization of the printer. The print service 23 is a service for providing the print function of the printer 2 to the terminal via the communication module 29. The print service 23 executes and manages print processing such as application, output, and cancellation of a print job. The status service 24 is a service for providing the use status of the printer 2 to the terminal via the communication module 29. The status service 24 returns and manages the use status of the printer 2. For example, the status service 24 returns the number of terminals which are accessing the printer 2, the number of jobs including those other than print jobs, and the operation status of the panel of the main body, determination of the congestion of the printer, and the like. The UI service 25 is a service for providing the UI function of the printer 2 to the terminal via the communication module 29. The UI service 25 is a service for providing UI processing such as setting, display, and instruction of the printer 2, and a UI display screen. For example, the setting UI of the printer, the display UI of the operation status of the printer, the print instruction UI to the printer, and the like are provided. The operation of the service 21 will be described later. To connect from the printer 2 to the mobile terminal 1 and print server group 4 by the Web, a Web server 27 is used.

The software arrangement of the print server group 4 will be explained. The print server group 4 is a cloud print service including a control module, print module, display module, and communication module. The print server group 4 cooperates with the mobile terminal 1 and printer 2. The print server group 4 can operate in synchronism with the operations of the mobile terminal 1 and printer 2, perform some processes in cooperation with the mobile terminal 1 and printer 2, or manage the operations of the plurality of mobile terminals 1 and the plurality of printers 2. As an example, the application 10 is a Web application of the print server group 4, and is downloaded to the mobile terminal 1 to locally operate on the Web browser 17. Furthermore, for example, the print server group 4 records pieces of operation information uploaded from the mobile terminal 1 and printer 2. In the present invention, the same processes as those of the mobile terminal 1 and printer 2 can be arranged in the print server group 4. Furthermore, in the present invention, the same processes as those of the mobile terminal 1 and printer 2 can be arranged in a PC terminal (not shown).

The view showing the example of the software arrangement according to this embodiment has been described. An example of the structure of data according to this embodiment will be explained.

[Software Arrangement (Data)]

An example of the structure of data held by the print system 9 will be described with reference to FIG. 3B. Data of the mobile terminal 1 and those of the printer 2 will be explained in the order named. Data examples of the mobile terminal 1 will be explained. A type identification universal unique ID (UUID) 32 is an identifier used by the application 10 to specify a target printer. In this example, for example, the UUID of an apparatus such as a printer is given to include information indicating the type of the apparatus (for example, a printer), and it is possible to determine the type of the apparatus having the UUID by referring to the type information. The type identification UUID (to be also referred to as an identification UUID hereinafter) 32 is type identification information included in the UUID. A list 33 of printers whose types can be identified by collating UUIDs with the identification UUID is a list of printers detected from the mobile terminal 1, and a list of UUIDs which have been determined as the UUIDs of printers among received UUIDs. Target printer information 34 stores information of a printer which has been selected to be a print target, for example, notification information (to be described later) of the target printer, printer apparatus information, a model name, service information, and the like. Distance measurement information 35 stores distance measurement information of the mobile terminal 1 and printer 2. Printout information 36 stores information about a print job. Congestion status information 37 stores information about a printer use status such as a congestion status. In this embodiment, the congestion status information 37 stores one of a congestion state (busy state) and a non-congestion state (ready state). However, for example, a state in which another user is already using the printer to be used, a state indicating paper out, and the like may be included. The congestion status can be acquired from the printer 2 or specified by the mobile terminal 1. A function setting 38 and an authentication setting 39 store settings about the function and authentication of the print system 9 and those of the application 10.

Data examples of the printer 2 will be described. Notification information 30 indicates contents of a signal transmitted from the printer. The notification information 30 includes a UUID as a printer identifier and information indicating a feature and a service to be provided. Printer apparatus information 31 is information in which a model use method provided by the printer to communicate with the mobile terminal 1 and perform processing is described. As described above, the printer 2 includes the service (that is, the printer 2 provides the service), and the service 21 includes the authentication service 22, print service 23, status service 24, and UI service 25. Data used to perform the operations and control processes of the services are included in the service 21. For example, the terminal can use the authentication service 22 including authentication information data. Furthermore, the terminal can use the status service 24 including printer use status data. The use method, details, and the like of the data will be described later with reference to flowcharts. The examples of the structures of the data according to this embodiment have been described. An overview of the operation of the print system will be explained.

[Overview of Operation of Print System]

Figure 4A:
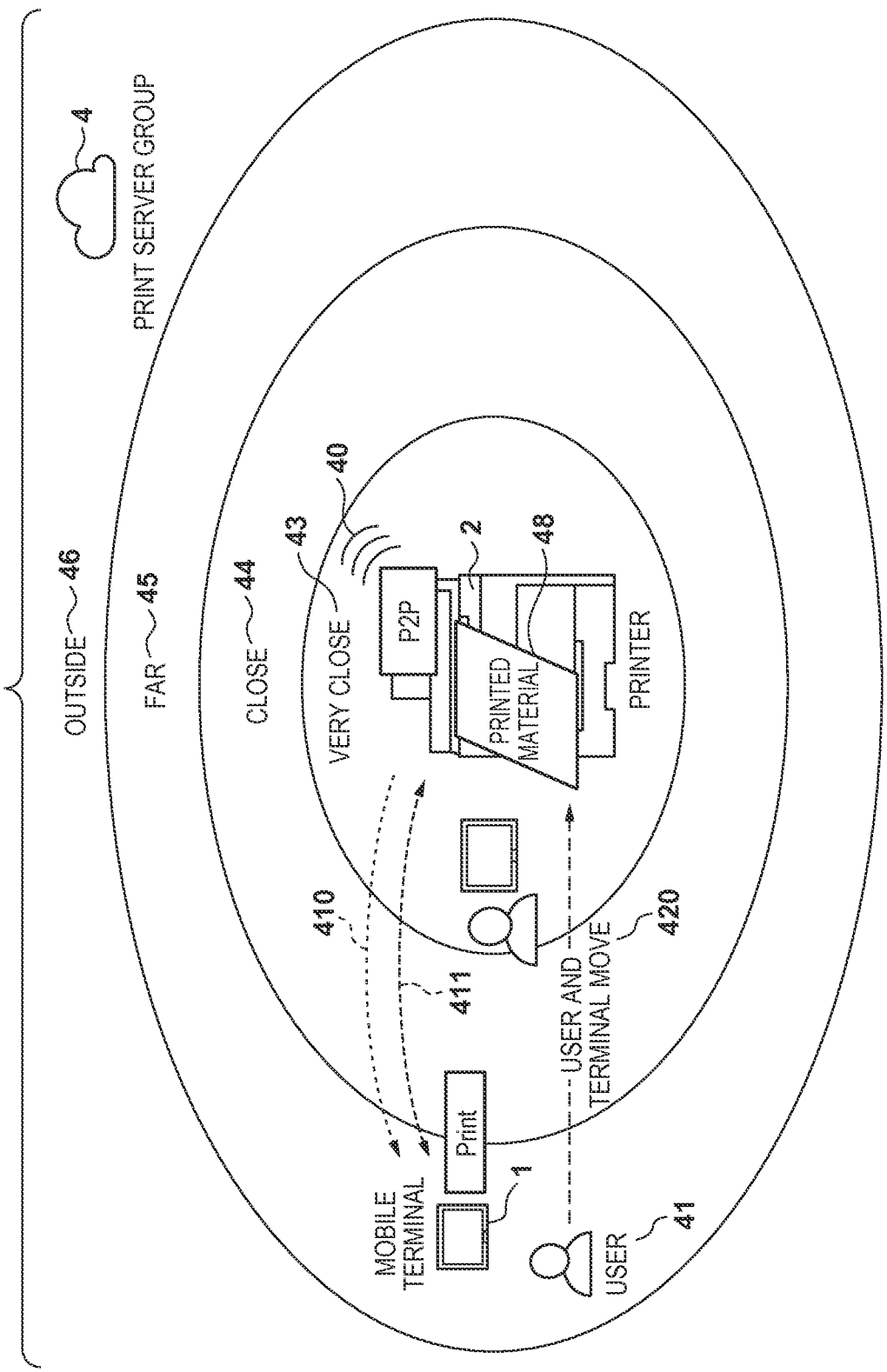

An overview of the operation of the print system 9 according to this embodiment will be described with reference to FIGS. 4A and 4B. FIG. 4A shows an example of the operation environment of the print system 9. A user 41 operates the mobile terminal 1 to print to the printer 2. The printer 2 transmits a notification signal 40 (to be also referred to as a beacon or the like hereinafter). The notification signal 40 is a signal which carries, for example, the notification information 30. The mobile terminal 1 detects the notification signal 40 of the printer 2 (410), and communicates with the target printer (411), thereby printing a printed material 48. Depending on a distance, the coverage of the notification signal 40 is identified as a "very close" region 43 as the third distance, a "close" region 44 as the second distance, or a "far" region 45 as the first distance, and the non-coverage is identified as an "outside" region 46. The user 41 and the mobile terminal 1 move within the regions 43, 44, 45, and 46 (420). The classification criterion of the coverage can be determined by performing comparison with a threshold of a predetermined range.

FIG. 4B shows an example of the overview of the operation of the print system 9. An example of an operation in which when the user moves closer to the printer, printing is executed will be explained first. The user 41 instructs printing from the mobile terminal 1 (401). When the user 41 moves closer to the printer 2 together with the mobile terminal 1, and enters the very close region 43 (404), the printer 2 prints the printed material 48 (405).

An example of an operation in which even if the user is far away from the printer, he/she can stand by will be described next. The user 41 instructs printing from the mobile terminal 1 (401). The user 41 sees a message "printer is busy" displayed on the mobile terminal 1 (402). The user 41 immediately stops moving closer to the printer 2, and stands by (403). After a while, when a message "printer is ready" is displayed on the mobile terminal 1, the user 41 starts moving closer to the printer 2. The printer 2 prints the printed material 48 (405).

The overview of the operation of the print system according to this embodiment has been described. Screen examples of the print system will be sequentially described. An example of a printer selection screen will be explained first.

[Display Example of Printer Selection Screen]

FIG. 5 shows a display example of the printer selection screen of the application 10 of the mobile terminal 1. The application 10 displays a document and an image 502 like a screen 500. In the document screen 500, a "send" button 501 is selected.

Then, the screen 500 displays a command window 511. When the user presses a "notification detection" button 512 in the command window 511, a "printer list" 513 including detected printers is displayed. The user selects a printer to be used for printing from the "printer list" 513. Note that a case in which the "notification detection" button 512 is prepared has been explained. However, printer selection processing of displaying a printer list from a print menu and selecting a printer is also applicable to this embodiment.

The display example of the printer selection screen of the application 10 of the mobile terminal 1 has been described. A display example of a screen after the start of printing will be explained.

[Example of Screen Display after Start of Printing]

FIG. 6 shows an example of screen display after the start of printing by the application 10 of the mobile terminal 1. The application 10 displays a screen 600 after the start of printing. The screen 600 includes "selected printer" display 601 and a "distance measurement" window 602. The "selected printer" display 601 displays the printer selected on the above-described printer selection screen. A printer P1000 is selected. The "distance measurement" window 602 displays the distance measurement status from the mobile terminal 1 to the printer 2 and information, and includes "region marks" 60. The "region marks" 60 are lit in the order of the far region 45, close region 44, and very close region 43 in accordance with the identified distance. The identified distance falls within the outside region 46, the "region marks" 60 are not displayed.

The application 10 also displays a screen 610 after printing. The application 10 displays "response display" 61 from the "distance measurement" window 602 when it is necessary to return a response (notification) to the user 41. Status information, a message, a command, and the like to the user are displayed on the "response display" 61. For example, the congestion status is displayed, as indicated by status display 612. Note that the "response display" 61 can be displayed by a program, as needed, and can be opened/closed by a user operation.

The example of screen display after the start of printing by the application 10 of the mobile terminal 1 has been described. The relationship between the "region marks" 60 and "response display" 61 in a print operation will be considered.

[Example of Relationship Between Operation and Screen Display]

Figure 7A:
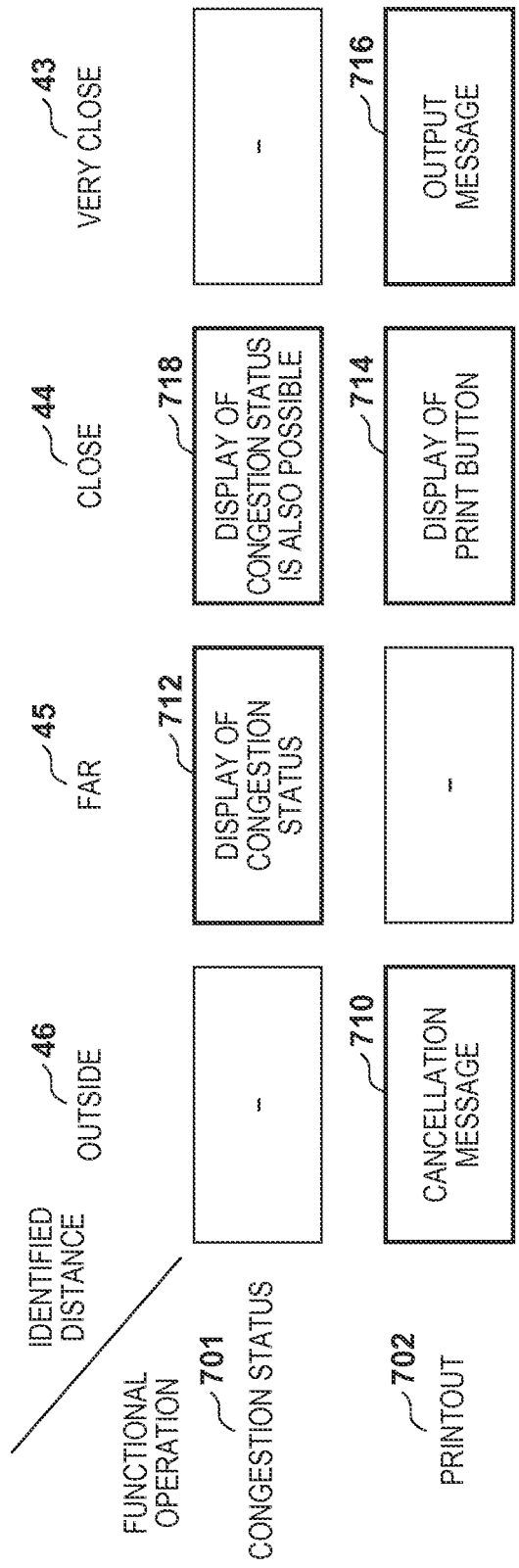
FIGS. 7A to 7E are views showing an example of the relationship between the operation of the application 10 and screen display.

The operation of the print system 9 and the screen display of the application will be described with reference to FIG. 7A to 7E. FIG. 7A is a table showing the relationship between the identified distance, the functional operation, and response display. Contents of response display for each identified distance will be explained.

If the identified distance is classified as the outside region 46, the user is outside the coverage of the notification signal, and thus a congestion status 701 need not be displayed and a print cancellation message is displayed as a printout 702 (710).

If the identified distance is classified as the far region 45, the user is in a region far from the printer 2, and thus the congestion status at this time is displayed as the congestion status 701 (712) and the printout 702 need not be displayed.

If the identified distance is classified as the close region 44, the user is in a region close to the printer 2, and thus the congestion status at this time can be displayed as the congestion status 701 (718) and a "print" button is displayed as the printout 702 (714), thereby prompting the user to make a selection. This selection can start execution of printing before the user reaches the printer 2.

If the identified distance is classified as the very close region 43, if the user has reached the printer 2 and execution of printing from the application 10 has started, the congestion status 701 need not be displayed, and an output message of printing is displayed as the printout 702 (716).

The overall table will be considered. The display 710, 712, 714, or 716 requires response display. There are two types of functional operations, that is, the congestion status and printout but there is only one case for each identified distance in which response display is required, and the identified distance and the contents of response display have a one-to-one correspondence. That is, the two response displays of the two types of functional operations are not always required to be displayed, and only one response display corresponding to each identified distance can be displayed.

Figure 7B:
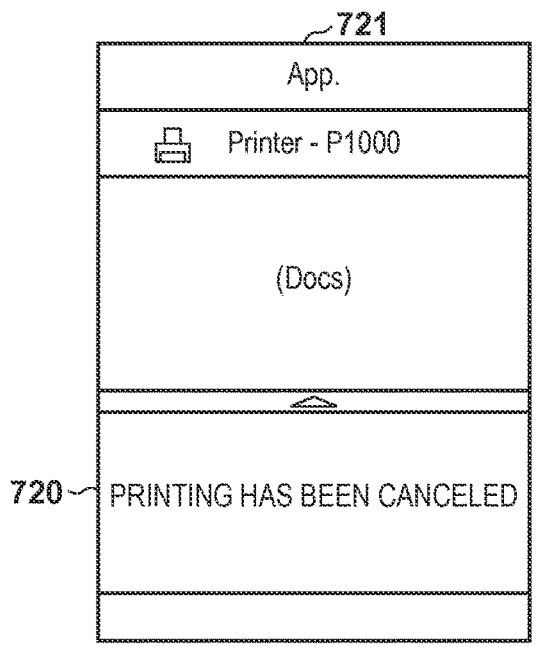
Figure 7C:
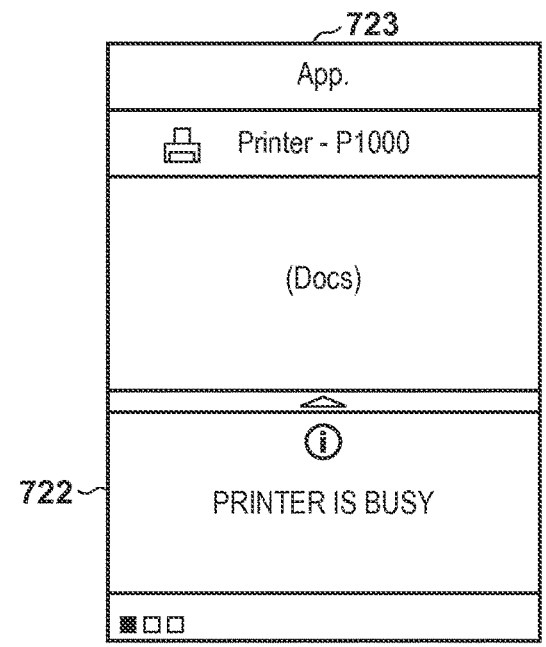
Figure 7D:
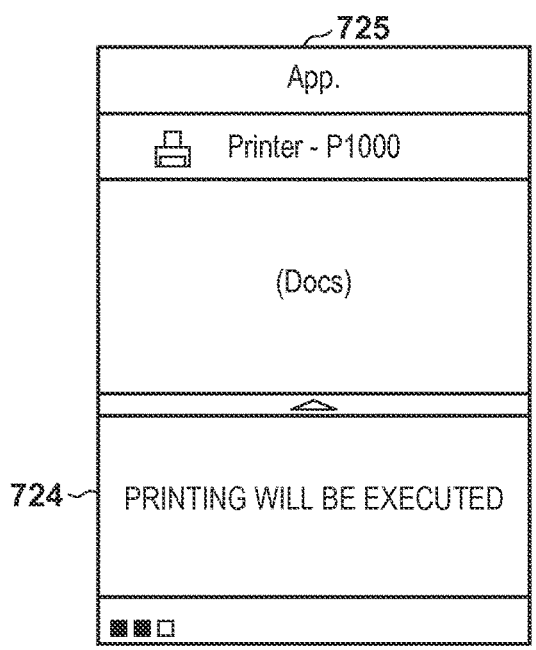
Figure 7E:
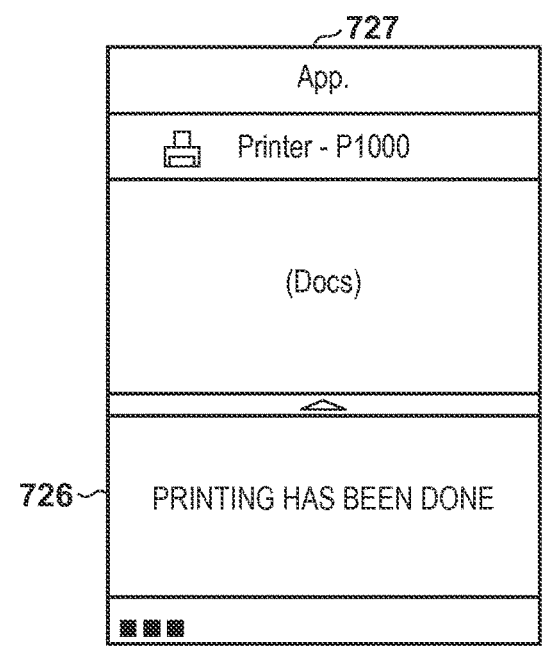

Each of FIGS. 7B to 7E shows an example of the screen of the application 10, which reflects FIG. 7A described above. If the identified distance is classified as the outside region 46, the application 10 displays a screen 721 (FIG. 7B). Response display 720 indicates a print cancellation message. If the identified distance is classified as the far region 45, the application 10 displays a screen 723 (FIG. 7C). Response display 722 is display of the congestion status. If the identified distance is classified as the close region 44, the application 10 displays a screen 725 (FIG. 7D). Response display 724 is display of the "print" button. If the identified distance is classified as the very close region 43, the application 10 displays a screen 727 (FIG. 7E). Response display 726 indicates an output message of printing.

The operation of the print system and screen display of the application have been explained above. The display contents of the screen of the print system can be controlled in accordance with the identified distance. An example of an application setting screen will be explained.

[Examples of Setting Screen and Authentication Screen]

Figure 8A:
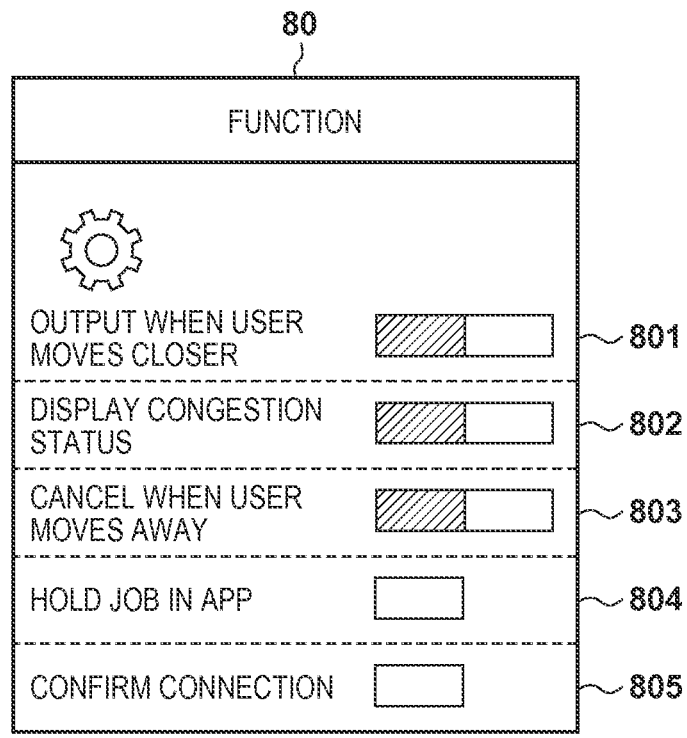
FIG. 8A is a view showing an example of the setting screen of the application 10.
Figure 8B:
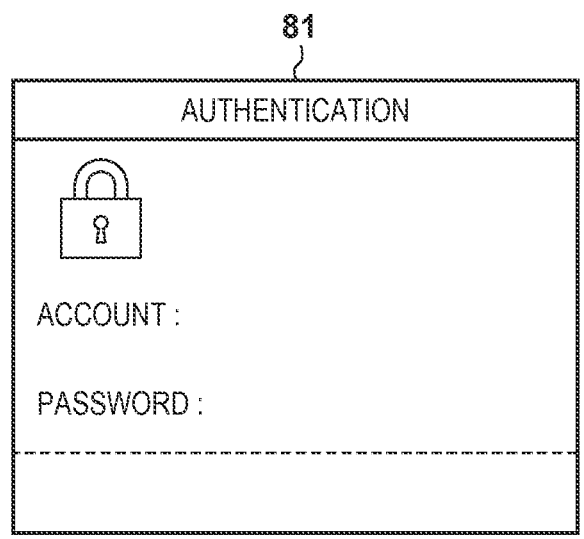
FIG. 8B is a view showing an example of the authentication screen of the application 10.

Examples of the function setting screen and authentication setting screen of the application will be described with reference to FIGS. 8A and 8B. A function setting screen 80 of the application shown in FIG. 8A is an example of a screen for setting the function of the application. This screen is a screen capable of setting the functional operations explained above.

Close proximity output setting (801) for outputting data when the user moves closer is setting of printout control according to the proximity of the printer. Congestion status display setting (802) for displaying the congestion status is setting of display of the congestion status of the printer. Cancellation setting (803) for performing cancellation when the user moves away is setting of print cancellation control based on the separation from the printer. For example, a case in which the identified distance is determined as the far region 45 corresponds to the "separation". Holding setting (804) for holding a job in the application is setting of holding a print job in the application. Connection confirmation setting (805) for confirming a connection is setting of whether to confirm a connection to the printer every time. An authentication setting screen 81 of the application is an example of a screen for authentication by the printer. The authentication setting screen 81 shown in FIG. 8B includes input files of an account and password as user information. The examples of the function setting screen and authentication setting screen of the application have been described. The congestion status of the response display will be explained. When the user inputs user information registered in advance, and the printer authenticates the user information, the user can use the printer.

[Example of Status Determination of Printer at Time of Printing]

The congestion status of the response display, that is, an example of determination of the congestion information of the printer will be supplementarily described with reference to FIG. 9. Although partially shown in FIGS. 7B to 7E, the congestion status is displayed in two stages, that is, "busy" and "ready" in this embodiment. The fact that the printer is busy, that is, a print job will not be output immediately is fed back to the user by the response display 722. Since the printer 2 is commonly used, the time taken to execute printing varies depending on the size of a job and the number of jobs. Therefore, the printer 2 desirably determines the congestion status. More specifically, if many execution jobs are accumulated in the printer 2 (that is, many jobs waiting for execution are queued), it is determined that the printer 2 is "busy", and a response or display contents are formed and displayed by the mobile terminal 1. The status service 24 of the printer 2 determines that the printer 2 is "busy" and the UI service 25 of the printer 2 forms a UI indicating that the printer 2 is busy. This UI is transmitted to the mobile terminal 1, and displayed on the mobile terminal 1. Note that the congestion status is evaluated as follows. However, even if the printer cannot determine that it is busy, the mobile terminal may perform determination based on indirect information.

Figure 9:
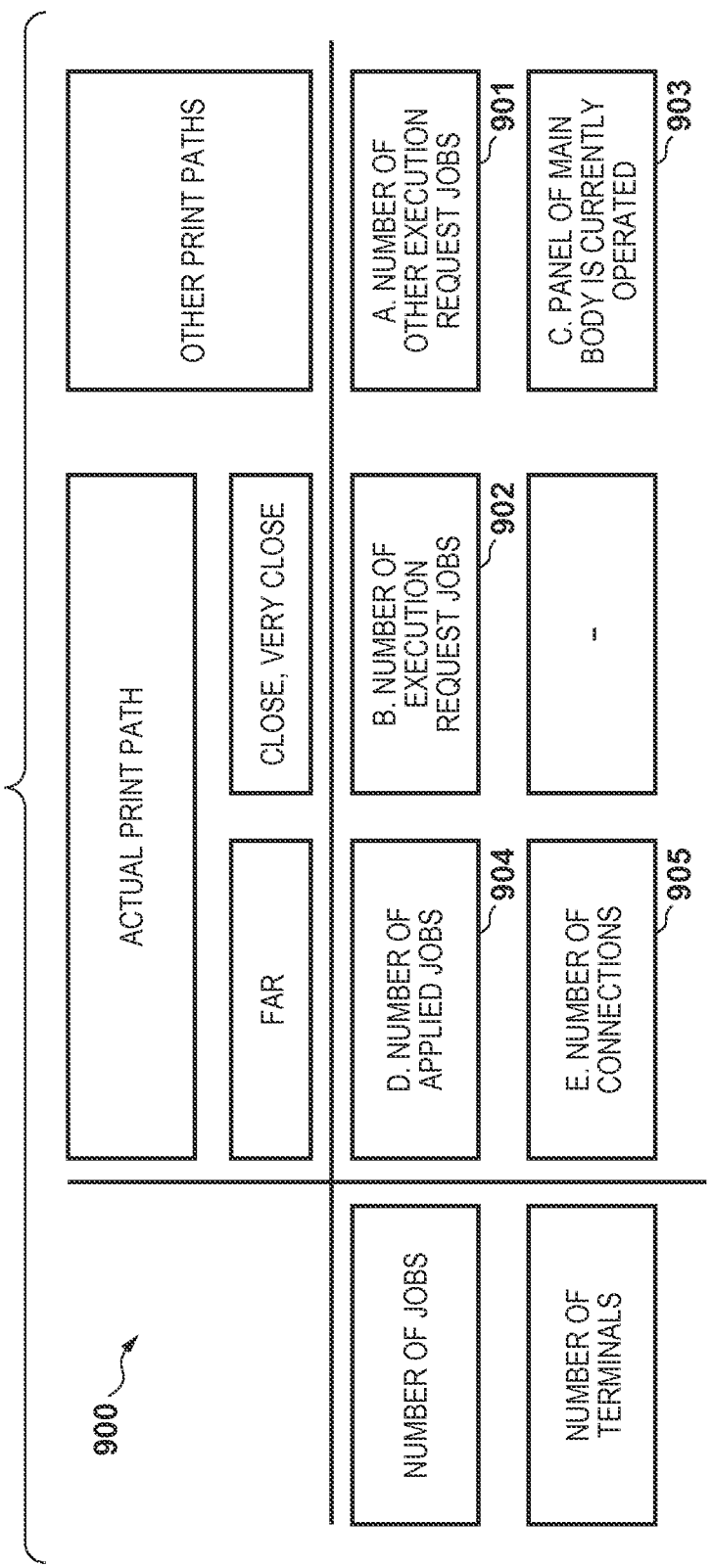
FIG. 9 is a view showing an example of status determination of a printer 2 at the time of printing of the print system 9.

The table of FIG. 9 shows an example of substituting data of the number of jobs currently processed by the printer and the number of terminals currently accessing the printer. In the table shown in FIG. 9, the abscissa represents a print path and distance, and the ordinate represents a parameter type. Referring to FIG. 9, there are a path (corresponding to an "actual print path") using short distance communication and other print paths (for example, a LAN to which the printer 2 belongs and the like) as print paths, and short distance communication is classified into a case in which the distance is "far" and a case in which the distance is "close" or "very close". On the other hand, parameters indicate the number of jobs and the number of terminals. Note that the meaning of the number of jobs and that of the number of terminals change depending on the print path and distance. In short distance communication, the number of jobs is the number of jobs which have been instructed to be executed. However, if the distance range is "far", the number 904 of applied jobs is counted. If the distance range is "close" or "very close", a job execution request is sent to the printer 2, queued, and spooled, and thus the number of jobs is the number 902 of jobs which have been requested to be executed. When a print path is other than the path using short distance communication, the number of jobs is a number 901 of execution request jobs in the path. Furthermore, in short distance communication, if the distance range is "far", the number of terminals is a number 905 of connected terminals. When a print path is other than the path using short distance communication, a parameter indicates whether the user currently operates the panel of the main body. The mobile terminal 1 refers to the data of the number of execution jobs and the number of accessing resources of the printer 2 at given intervals or at the time of update. Alternatively, the mobile terminal 1 refers to the information of the printer spooler at given intervals or at the time of update, thereby acquiring parameters such as the number of jobs and the number of terminals shown in FIG. 9. The printer 2 holds these parameters in a memory or the like so as to provide them to the terminal 1, as a matter of course. Based on the acquired number of jobs and the acquired number of terminals, it is determined whether the printer is in the congestion state. Numbers A and B of execution jobs are important for determination. Parameter C indicating that the panel of the main body is currently operated, that is, the user currently accesses the main body is taken into consideration. An example of determining that the printer is busy by using the numerical values of the table shown in FIG. 9 is as follows.

(A>1) and C or (A or B)>2 or (D or E)>3

If the value of the evaluation expression is true, it is determined that the printer is busy. The result of determining the congestion status is saved in the congestion status information 37. Note that in the formulas, "(A or B)>2" indicates A>2 or B>2, and "(D or E)>3" indicates D>3 or E>3.

The example of determination of the congestion status information of the printer has been supplementarily described above. The flowchart of the print system will be described next.

[Overall Flowchart of Print System]

Figure 10:
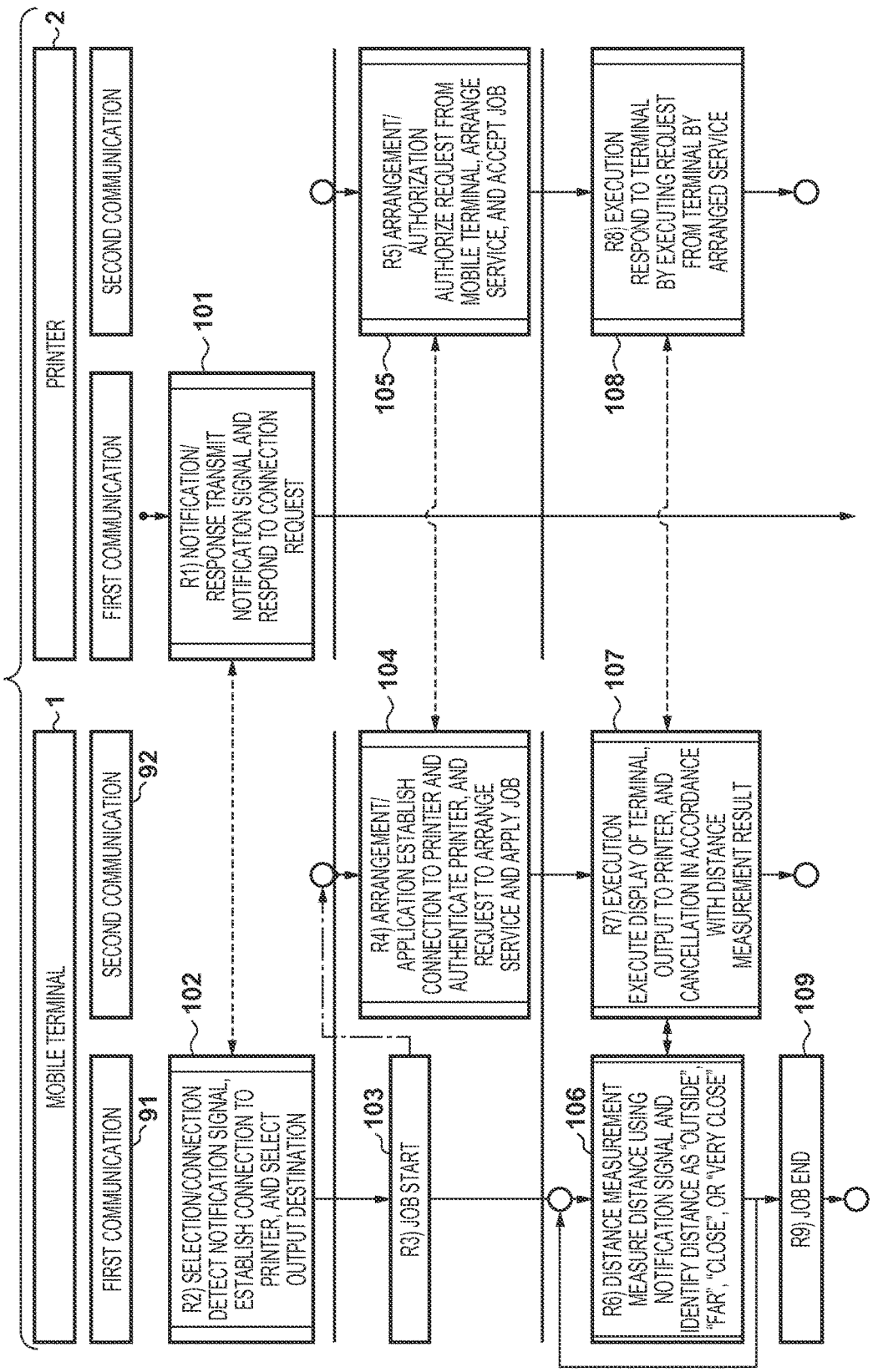
FIG. 10 is an overall flowchart illustrating processes 101 to 109 of the print system 9.

FIG. 10 is an overall flowchart of the print system 9. A flowchart on the left side is executed by the control module 11 of the application of the mobile terminal 1, and a flowchart on the right side is executed by the control module 20 of the printer 2. Furthermore, in each apparatus, processes on the left side are associated with the first communication mode (LE mode or the like), and processes on the right side are associated with the second communication mode (normal mode or the like). That is, in the processes associated with the first and second communication modes, communication operations are performed in the first and second communication modes, respectively. Referring to FIGS. 10 to 16, when communicating with the mobile terminal 1 or printer 2 in a step described as processing associated with each communication mode, communication is performed in the communication mode associated with the step. The procedure of the flowchart will be described in large processing units, and each process will be described later. The application 10 of the terminal 1 detects the notification signal 40 of the printer 2 to select the printer 2. The application 10 of the terminal 1 applies a print job to the printer 2, and simultaneously starts distance measurement. When the distance falls within the very close region, the application 10 issues an output request to the printer 2.

Processing 101 is notification/response processing of the printer 2. The control module 20 of the printer 2 transmits the notification signal 40 via the communication module 29. The control module 20 also responds to a connection request from the mobile terminal 1.

Processing 102 is selection/connection processing of the mobile terminal 1. The control module 11 of the mobile terminal 1 detects the notification signal via the communication module 19. The control module 11 is connected to the printer 2 to inspect information of the printer, and selects a printout destination.

Processing 103 is job start processing of the mobile terminal 1. The control module 11 of the mobile terminal 1 detects, for example, a start instruction from the user via a display module 18.

Processing 104 is arrangement/application processing of the mobile terminal 1. The control module 11 of the mobile terminal 1 establishes a connection to the printer 2 via the communication module 19, and authenticates the printer 2. The control module 11 requests the printer 2 to arrange a service, and applies a print job. Arrangement of a service indicates, for example, a result of a given service or a parameter for transferring the result, and requesting arrangement of a service is synonymous with requesting provision of a service and its result.

Processing 105 is arrangement/authorization processing of the printer 2. The control module 20 of the printer 2 authorizes the request from the mobile terminal 1 via the communication module 29, arranges the service, and accepts the print job.

Processing 106 is distance measurement processing of the mobile terminal 1. The control module 11 of the mobile terminal 1 starts distance measurement processing in synchronism with R3) job start processing. The control module 11 of the mobile terminal 1 measures the distance to the printer 2 using the notification signal 40 received via the communication module 19. The control module 11 identifies the distance as the outside, far, close, or very close region.

Processing 107 is execution processing of the mobile terminal 1. The control module 11 of the mobile terminal 1 executes display of the terminal via the display module 18, output to the printer 2 via the communication module 19, and a cancellation request in accordance with the identified distance, thereby performing print control.

Processing 108 is execution processing of the printer 2. The control module 20 of the printer 2 receives a request from the mobile terminal 1 via the communication module 29, and the arranged or provided service responds to the request by executing it.

Processing 109 is job end processing of the mobile terminal 1. The control module 11 of the mobile terminal 1 receives the response from the printer 2 via the communication module 19, and ends print job processing.

The overall flowchart of the print system 9 has been explained. Flowcharts in the above-described processes will be sequentially described later. The print system 9 starts an operation upon detecting the continuously transmitted notification signal 40, and controls the operation by identifying the distance using the notification signal 40. Identification of the distance by the print system 9 and the operation control based on it reduce the number of selection operations by the user, thereby improving the convenience of the system.

[Flowchart of Processing 102 of Control Module 11 of Terminal (Selection/Connection)]

Figure 11:
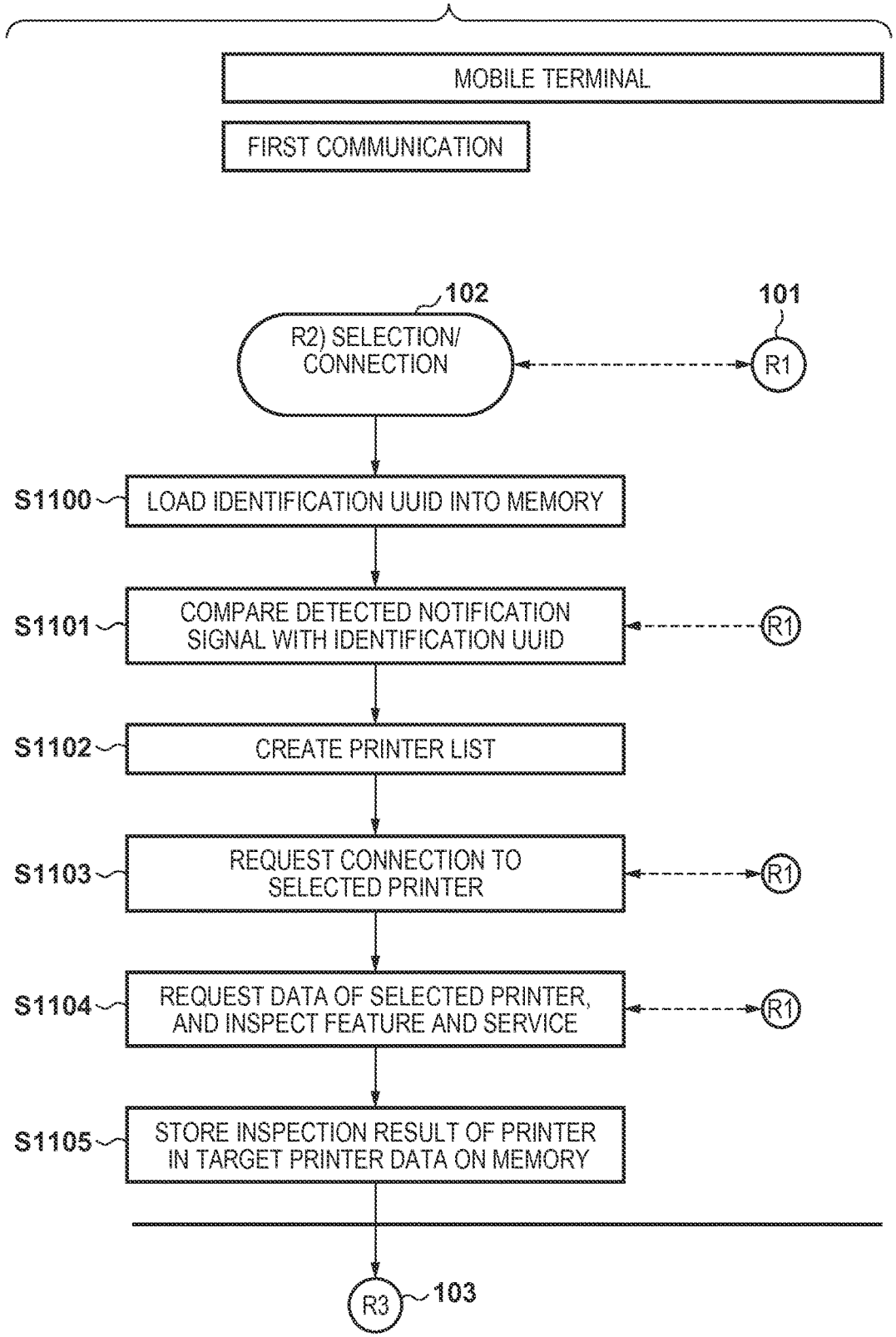
FIG. 11 is a flowchart illustrating the processing 102 of a control module 11 of a terminal.

FIG. 11 is a flowchart of the selection/connection processing 102 of the control module 11 of the mobile terminal 1. The control module 11 of the mobile terminal 1 executes the application 10. The control module 11 detects the notification signal via the communication module 19. The control module 11 is connected to the printer 2 to inspect information of the printer, and selects a printout destination. The processing 102 is R2) selection/connection processing of the mobile terminal 1. Note that reference symbol in a circle denotes transmission or reception to or from a step indicated by "Rn)" (n is one of 1 to 9) described in each step in FIG. 10.

In step S1100, the control module 11 loads the identification UUID 32 into the memory. The identification UUID loaded in step S1100 is information for identifying based on the received UUID that an apparatus having the UUID is a printer, as described above. In step S1101, the control module 11 compares the UUID contained in the detected notification signal 40 with the identification UUID 32, and identifies whether the apparatus is a printer apparatus. In step S1102, the control module 11 creates the list 33 of printers detected by notification signals. The control module 11 then displays the list. In step S1103, the control module 11 issues, via the communication module 19, a connection request to the printer 2 designated and selected by the user from the printer list 33, and obtains a response. In step S1104, the control module 11 requests data of the selected printer 2 via the communication module 19, and inspects the feature and service of the selected printer 2 from the returned data. The inspection processing includes specifying information indicating the feature and service from the returned data, and extracting the information. In step S1105, the control module 11 stores, in the target printer information 34 on the memory, the inspection result of the printer 2, that is, the specified information indicating the feature and service. The flowchart of the processing 102 of the control module 11 of the mobile terminal 1 has been explained.

[Flowchart of Processes 103 and 104 of Control Module 11 of Terminal (Arrangement/Application)]

FIG. 12 is a flowchart of the processes 103 and 104 executed by the control module 11 of the mobile terminal 1. The control module 11 of the mobile terminal 1 executes the application 10. The control module 11 of the mobile terminal 1 detects a start instruction from the user via the display module 18. The control module 11 of the mobile terminal 1 is connected to the printer 2 via the communication module 19 to perform authentication. The control module 11 requests the printer to arrange a service, and applies a print job.

The processing 103 is job start processing of the mobile terminal 1. The control module 11 detects a start instruction input from the user via the display module 18. The control module 11 starts the processing 104.

The processing 104 is arrangement/application processing of the mobile terminal 1. Details of the processing 104 are shown in step S1200 and subsequent steps.

In step S1200, the control module 11 is connected to the printer 2 via the communication module 19 in the second communication mode by referring to the target printer information 34 on the memory. If it is determined in step S1210 that the printer 2 requires authentication, the control module 11 advances to step S1211; otherwise, the control module 11 advances to step S1220. If it is determined in step S1211 that authentication information is saved in the authentication setting 39, the control module 11 advances to step S1213; otherwise, the control module 11 advances to step S1212.

In step S1212, the control module 11 displays the authentication screen. The authentication screen is a screen used by the user to input user information such as a user ID and password. In step S1213, the control module 11 saves the authentication information input by the user in the authentication setting 39 in accordance with the setting.

In step S1214, the control module 11 transmits an authentication request to the printer 2 via the communication module 19 together with the authentication information, and obtains a response. In step S1220, the control module 11 requests, via the communication module 19, the printer 2 to arrange a service, and obtains a response. In step S1221, the control module 11 records the response in the target printer information 34 on the memory. In step S1230, the control module 11 applies a job to the print service 23 of the printer 2 via the communication module 19, and obtains a response. Applying a job indicates holding a job without executing the job. That is, print data is transferred to the printer 2 but is not stored in an execution queue and waits for an execution instruction. This print job is queued in accordance with an execution instruction. In step S1231, the control module 11 records the applied job in the printout information 36 on the memory. The flowchart of the processes 103 and 104 of the control module 11 of the mobile terminal 1 has been explained.

[Flowchart of Processes 106, 107, and 109 of Control Module 11 of Terminal (Distance Measurement/Execution)]

Figure 13A:
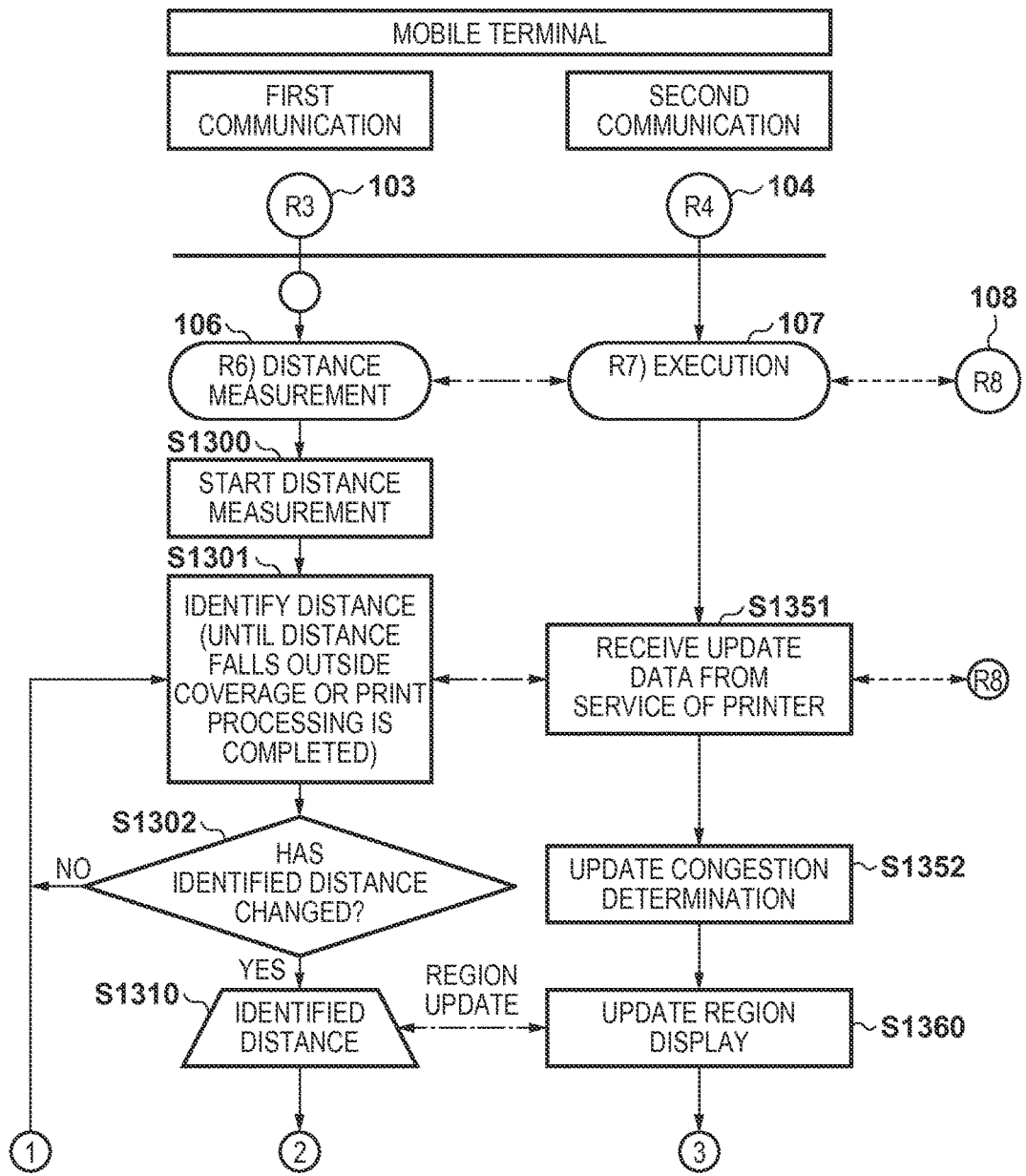
FIGS. 13A and 13B are flowcharts illustrating the processes 106, 107, and 109 of the control module 11 of the terminal.
Figure 13B:
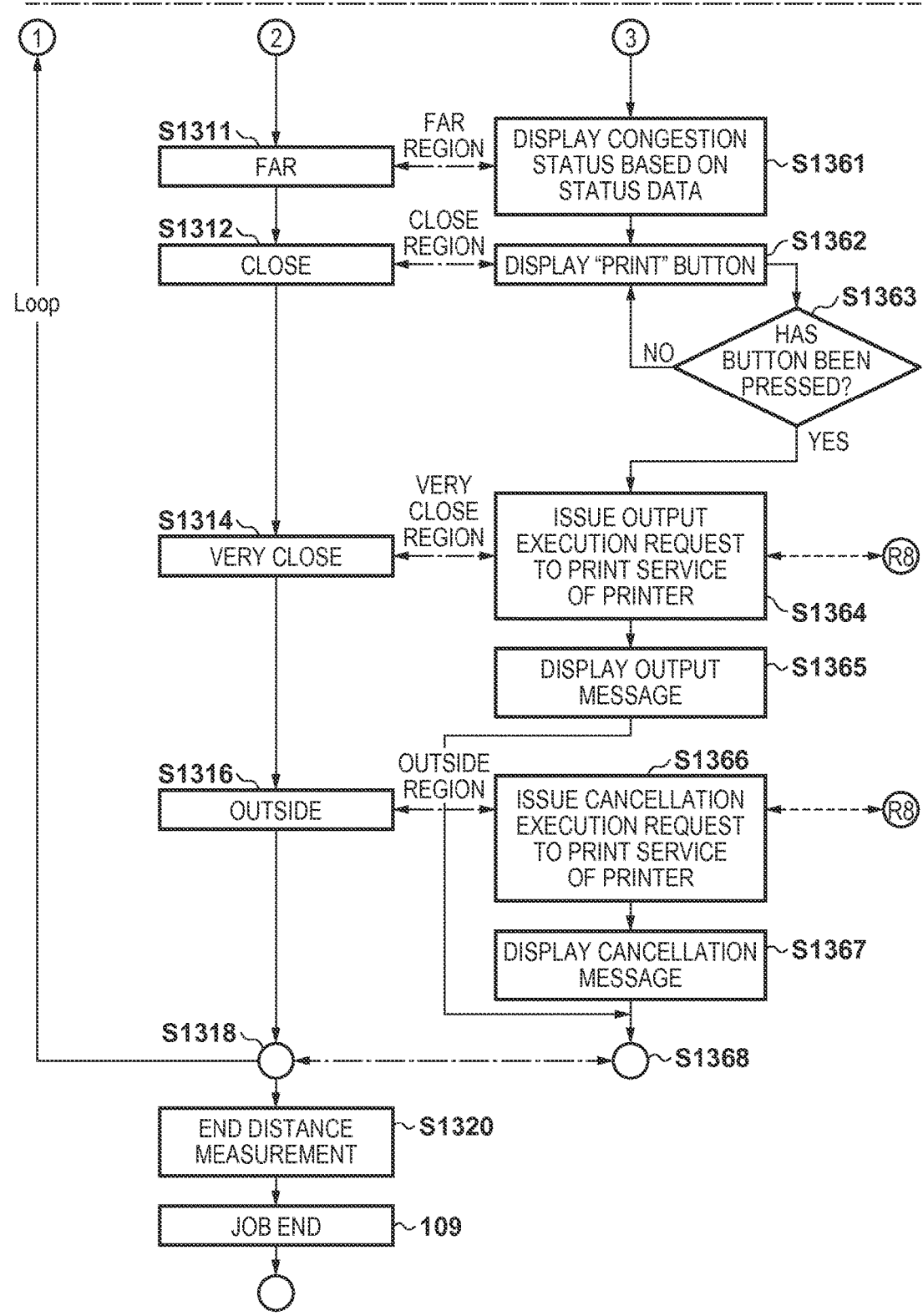

FIGS. 13A and 13B are flowcharts of the processes 106, 107, and 109 of the control module 11 of the mobile terminal 1. The control module 11 of the mobile terminal 1 executes the application 10. The control module 11 starts the distance measurement processing 106 in synchronism with the job start processing 103. The distance measurement processing is associated with the first communication mode, and implemented using the first communication mode, for example, the Bluetooth® LE mode. The control module 11 performs distance measurement using the notification signal 40 received via the communication module 19, that is, measures the distance between the mobile terminal 1 and the printer 2. The control module 11 identifies the distance as the outside, far, close, or very close region. The control module 11 executes display of the terminal via the display module 18, output to the printer 2 via the communication module 19, and a cancellation request in accordance with the identified distance. After that, the control module 11 receives a response from the printer 2 via the communication module 19, and ends print job processing.

The processing 106 is distance measurement processing of the mobile terminal 1. In step S1300, the control module 11 starts distance measurement. In step S1301, the control module 11 identifies the distance. The distance is identified as the outside, far, close, or very close region. As for identification of the distance, for example, the range of each category is set in advance, and a category to which the distance obtained as a result of distance measurement belongs is identified in accordance with a range to which the distance belongs. This identification processing continues until the distance falls outside the coverage of the notification signal 40 or print processing is completed, and the process advances to step S1320 when the above condition is satisfied. That is, as for the printer connected by detecting the notification signal, processing according to the range of the distance to the printer is executed as will be described later, and distance measurement is repeatedly performed at regular intervals until the distance to the printer falls outside the coverage or the printer executes and completes printing. If it is determined in step S1302 that the identified distance has changed, the control module 11 advances to step S1310; otherwise, the control module 11 advances to step S1301.

In step S1310, the control module 11 starts to select an operation according to the identified distance. The changed identified distance is recorded in the distance measurement information 35. The control module 11 selects step S1360 as a region update operation. In step S1311, the control module 11 selects an operation corresponding to a case in which the identified distance is classified as the far region. The control module 11 selects step S1361 as an operation in the far region 45. In step S1312, the control module 11 selects an operation corresponding to a case in which the identified distance is classified as the close region. The control module 11 selects step S1362 as an operation in the close region 44. In step S1314, the control module 11 selects an operation corresponding to a case in which the identified distance is classified as the very close region. The control module 11 selects step S1364 as an operation in the very close region 43. In step S1316, the control module 11 selects an operation corresponding to a case in which the identified distance is classified as the outside region. The control module 11 selects step S1366 as an operation in the outside region 46. In step S1320, the control module 11 ends distance measurement. Note that even if the distance is short, the printer and the terminal may be separated by a partition. To cope with this, the positional relationship of the mobile terminal with respect to the printer may be specified in addition to the distance. For example, a front direction is set for each printer, and if the positional relationship does not indicate the front direction, the mobile terminal may be determined in the outside region regardless of the distance.

The processing 107 is execution processing of the mobile terminal 1. In step S1351, the control module 11 receives update data such as a congestion status from the print service 23 or status service 24 of the service 21 of the printer 2 via the communication module 19. The received data is recorded in the target printer information 34, printout information 36, and congestion status information 37 on the memory. In step S1352, the control module 11 updates the congestion determination with update of the congestion status information 37.

In step S1360, the control module 11 refers to the distance measurement information 35 on the memory, and updates, via the display module 18, display of the region marks 60 by contents indicating the identified distance determined in step S1310 in accordance with the category of the identified distance.

In step S1361, the control module 11 updates the response display 722 of the congestion status via the display module 18 by referring to the congestion status information 37 on the memory. In step S1362, the control module 11 displays the "print" button 724 via the display module 18. If it is determined in step S1363 that the "print" button 724 has been pressed, the control module 11 advances to step S1364; otherwise, the control module 11 advances to step S1362. In step S1364, the control module 11 issues an output execution request to the print service 23 of the printer 2 via the communication module 19, and obtains a response such as an output completion response or output failure response. In step S1365, the control module 11 displays a message corresponding to an output result, for example, the output message 726 via the display module 18. In step S1366, the control module 11 issues a cancellation execution request, that is, a deletion request to the print service 23 of the printer 2 via the communication module 19, and obtains a response. In step S1367, the control module 11 displays the cancellation message 720 via the display module 18.

The processing 109 is job end processing of the mobile terminal 1. Since the processes 106 and 107 are complete, the control module 11 ends. The flowchart of the processes 106, 107, and 109 of the control module 11 of the mobile terminal 1 has been explained.

[Flowchart of Processing 101 of Control Module 20 of Printer (Notification/Response)]

FIG. 14 is a flowchart of the processing 101 of the control module 20 of the printer 2. The control module 20 transmits the notification signal 40 via the communication module 29. The control module 20 also responds to a connection request from the mobile terminal 1.

The processing 101 is notification/response processing of the printer 2. In step S1401, the control module 20 transmits the notification signal 40 via the communication module 29. Contents of the notification signal 40 indicate the notification information 30. This operation of transmitting the notification signal is indicated as a step for the descriptive purpose of the flowchart but is continued. In step S1402, the control module 20 responds to a connection request from the mobile terminal 1 via the communication module 29. In step S1403, the control module 20 returns the feature, service data, and printer apparatus information 31, which have been requested by the mobile terminal 1 via the communication module 29. The flowchart of the processing 101 of the control module 20 of the printer 2 has been explained.

[Flowchart of Processes 105 and 108 of Control Module 20 of Printer (Arrangement, Authorization, Execution)]

Figure 15:
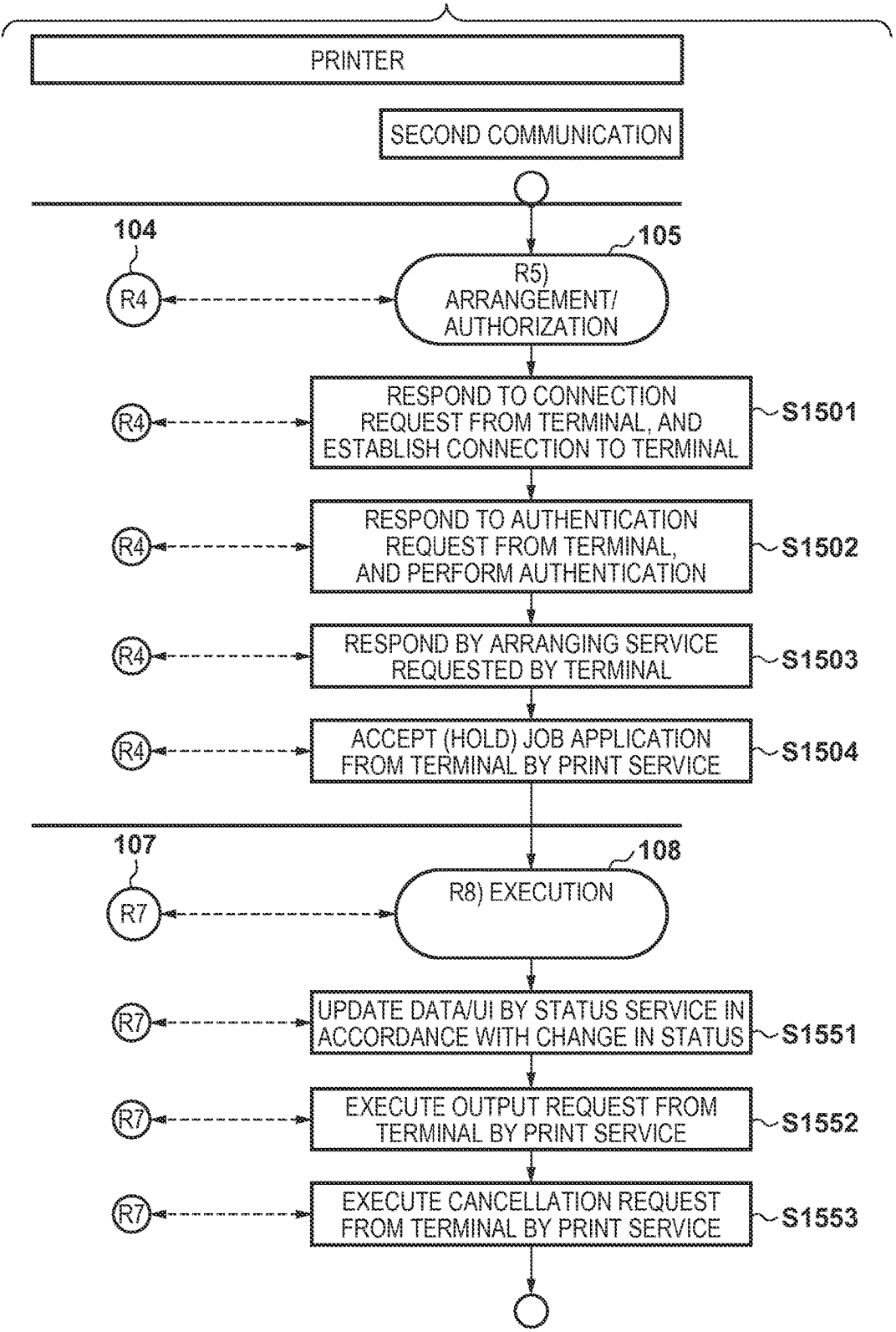
FIG. 15 is a flowchart illustrating the processes 105 and 108 of the control module 20 of the printer.

FIG. 15 is a flowchart of the processes 105 and 108 of the control module 20 of the printer 2. The control module 20 authorizes a request from the mobile terminal 1 via the communication module 29, arranges the service 21, and accepts a print job. The control module 20 receives a request from the mobile terminal 1 via the communication module 29, and the arranged service 21 responds to the request by executing it.

The processing 105 is arrangement/authorization processing of the printer 2. In step S1501, the control module 20 responds to a connection request from the mobile terminal 1 via the communication module 29, and establishes a connection. In step S1502, the control module 20 responds by accepting, by the authentication service 22, an authentication request from the mobile terminal 1 via the communication module 29. In step S1503, the control module 20 responds by arranging the service 21 requested by the mobile terminal 1 via the communication module 29. In step S1504, the control module 20 responds by accepting, by the print service 23, a job application from the mobile terminal 1 via the communication module 29. The job is held in the printer 2.

The processing 108 is execution processing of the printer 2. In step S1551, the control module 20 responds to the mobile terminal 1 via the communication module 29 by updating, by the status service 24, data in accordance with a change in status. Note that since the status of the printer 2 changes, the UI service 25 can also respond. In step S1552, the control module 20 responds by executing, by the print service 23, an output request from the mobile terminal 1 via the communication module 29. In step S1553, the control module 20 responds by executing, by the print service 23, a cancellation request from the mobile terminal 1 via the communication module 29, that is, by deleting a print job for which the cancellation request has been issued. The flowchart of the processes 105 and 108 of the control module 20 of the printer 2 has been explained.

As described above, according to this embodiment, a terminal which wants to measure the distance between the terminal and the printer in the first communication mode with small power, such as the Bluetooth LE mode, and execute a print job transmits the print job to the printer when the distance becomes shorter than a threshold indicating a "short distance". The print job is transmitted by communication in the second communication mode with larger power. The print job is made to wait for an execution instruction. The execution instruction is explicitly issued when the user of the terminal presses an execution instruction button or when the terminal moves closer to the printer and the distance becomes smaller than a threshold indicating a "very short distance". This instruction is issued without any explicit print instruction from the user. Printing starts by using the thus issued execution instruction as a trigger.

Therefore, the user of the terminal need not explicitly select a printer, and it is possible to start a printout only when the user moves closer to the printer, and to protect a printed material from other users, thereby improving the operability and productivity.

Second Embodiment

[Flowchart of Another Example of Processes 105 and 108 of Control Module 20 of Printer]

FIG. 16 is a flowchart of another example of the processes 105 and 108 of the control module 20 of a printer 2. Arrangements and processes other than the processes 105 and 108 in this embodiment are the same as those in the first embodiment and a description thereof will be omitted. In this example, a print system 9 does not hold a print job in the printer 2. Since a job is held in an application 10 on the side of a mobile terminal 1 or the like until a printout starts, the processing order of the flowchart is different from the order from a job application to an output request. The control module 20 authorizes a request from the mobile terminal 1 via a communication module 29, and arranges a service. The control module 20 receives a request from the mobile terminal 1 via the communication module 29, and responds by executing the request by the arranged service.

The processing 105 is arrangement/authorization processing of the printer 2. In step S1601, the control module 20 responds to a connection request from the mobile terminal 1 via the communication module 29, and establishes a connection. In step S1602, the control module 20 responds by accepting, by an authentication service 22, an authentication request from the mobile terminal 1 via the communication module 29. In step S1603, the control module 20 responds by arranging a service 21 requested by the mobile terminal 1 via the communication module 29.

The processing 108 is execution processing of the printer 2. In step S1651, the control module 20 responds to the mobile terminal 1 via the communication module 29 by updating, by a status service 24, data in accordance with a change in status. Note that since the status of the printer 2 changes, a UI service 25 can also respond. In step S1652, the control module 20 accepts a job from the mobile terminal 1 via the communication module 29, and responds by executing an output request by a print service 23.

The flowchart of the other example of the processes 105 and 108 of the control module 20 of the printer 2 has been explained. In the other example, a print job is intensively executed in step S1652. Consequently, the mobile terminal 1 does not issue job application, output, and cancellation requests to the print service in different steps (not shown). The other example is suitable for a case in which the printer 2 includes no spooler and cannot hold any job.

As described above, in printing from the mobile terminal to the printer in the print system according to this embodiment, operations including an authentication operation and the print standby time are reduced, thereby improving the user convenience. Furthermore, the display and operation change depending on the proximity status between the mobile terminal and the printer, that is, in accordance with a stepwise change in distance by movement, such as "outside"/"far"/"close"/"very close". The changing operation undergoes system control of the mobile terminal and printer, and ON/OFF of the operation is not switched by the sensor of the printer. Control processing is performed by additionally using close proximity communication, and the operation in the second communication mode is changed according to the status in the first communication mode.

The print system according to the present invention solves the problem that an operation of selecting a printer to be used from printers existing in a communication range in authentication or the like is added as compared with card authentication printing or the like, since the signal region overlaps that of a nearby printer when short distance communication is applied. Furthermore, the problem is solved that the number of actions is small and a printer use operation is hardly known among users to prolong the standby time of printing.

Other Embodiments

A characteristic arrangement has been described by exemplifying a printer in each embodiment of the present invention. However, the present invention is not limited to a printer, and is applicable to any system in which a mobile terminal and a device cooperate with each other. For example, the present invention is applicable to a scanner, FAX apparatus, moving image playback apparatus, and the like. The present invention is applicable to a mode in which a job application, instruction, and extraction are associated with each other in such device and a screen display mode at this time. The present invention is also applicable even if the processing relationship between the mobile terminal and the device is reversed.

Although the preferred embodiments of the present invention have been described in detail, the present invention is not limited to the specific embodiments, and various modifications and changes can be made within the spirit and scope of the present invention described in the appended claims.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-185698, filed Sep. 11, 2014 which is hereby incorporated by reference herein in its entirety.

What is claimed is:
1. An information processing terminal comprising:
a memory storing instructions related to an application for a print control; and
a processor which can execute the instructions causing the information processing terminal to:
receive wirelessly a signal in a first communication mode, which is transmitted from one of a printer and an accessory apparatus of the printer;
execute, according to a start instruction input by a user having the information processing terminal;
transfer print data to the printer by a communication established between the information processing terminal and the printer;
specify, based on the signal in the first communication mode according to the start instruction, a positional relationship with the printer as one of a first distance range, a second distance range closer than the first distance range, and a third distance range further closer than the second distance range;
display a print button on a predetermined display area provided by the application when the positional relationship with the printer to which the print data has been transferred falls within the second distance range; and change the display in the predetermined display area into a display showing a congestion status of the printer when the positional relationship with the printer to which the print data has been transferred falls within the first distance range.

2. The terminal according to claim 1, wherein when authentication by the printer is required to execute printing by the printer, authentication information input for the authentication is transmitted to the printer.

3. The terminal according to claim 1, wherein the printer is selected by a user from a list of printers each specified based on reception of the signal in the first communication mode.

4. The information processing terminal according to claim 1,
wherein an instruction to execute printing of the transferred print data is transmitted to the printer when the print button has been pressed.

5. The terminal according to claim 4, wherein when it is specified that the positional relationship with the printer changes from the second distance range to the third distance range, an instruction to execute printing of the transferred print data is transmitted to the printer without a press of the print button.

6. The information processing terminal according to claim 1, wherein the instructions further cause the information processing terminal to end a specification of the positional relationship with the printer based on the signal in the first communication mode according to a completion of the printing of the transferred print data.

7. The information processing terminal according to claim 1, wherein the communication established between the information processing terminal and the printer according to the start instruction is a second communication mode different than the first communication mode.

8. The information processing terminal according to claim 7, wherein the instructions further cause the information processing terminal to transmit by using the second communication mode, an instruction for deleting the transferred print data to the printer without instruction from the user in order that the printer does not print the transferred print data, in a case that the positional relationship with the printer is farther than the first distance range after the transfer of the print data and a print button displayed on the information processing terminal is not pressed.

9. An information processing method comprising:
wirelessly receiving a signal in a first communication mode, which is transmitted from one of a printer and an accessory apparatus of the printer;
executing, according to a start instruction input by a user having an information processing terminal;
transferring print data to the printer by a communication established between the information processing terminal and the printer;
specifying, based on the signal in the first communication mode according to the start instruction, a positional relationship with the printer as one of a first distance range, a second distance range closer than the first distance range, and a third distance range further closer than the second distance range;
displaying a print button on a predetermined display area provided by the application when the positional relationship with the printer to which the print data has been transferred falls within the second distance range; and
changing the display in the predetermined display area into a display showing a congestion status of the printer when the positional relationship with the printer to which the print data has been transferred falls within the first distance range.

10. A non-transitory computer-readable medium storing a program therein for causing a computer to execute an information processing method, the information processing method comprising:
wirelessly receiving a signal in a first communication mode, which is transmitted from one of a printer and an accessory apparatus of the printer;
executing, according to a start instruction input by a user having an information processing terminal;
transferring print data to the printer by a communication established between the information processing terminal and the printer;
specifying, based on the signal in the first communication mode according to the start instruction, a positional relationship with the printer as one of a first distance range, a second distance range closer than the first distance range, and a third distance range further closer than the second distance range;
displaying a print button on a predetermined display area provided by the application when the positional relationship with the printer to which the print data has been transferred falls within the second distance range; and
changing the display in the predetermined display area into a display showing a congestion status of the printer when the positional relationship with the printer to which the print data has been transferred falls within the first distance range.

* * * * *